(12) United States Patent
Nakamura et al.

(10) Patent No.: US 9,751,602 B2
(45) Date of Patent: Sep. 5, 2017

(54) FLOATING STRUCTURE FLUID DYNAMIC FORCE USE SYSTEM AND WIND-PROPELLED VESSEL

(71) Applicants: Takuju Nakamura, Tokyo (JP); Hiromichi Akimoto, Tokyo (JP)

(72) Inventors: Takuju Nakamura, Tokyo (JP); Hiromichi Akimoto, Tokyo (JP)

( * ) Notice: Subject to any disclaimer, the term of this patent is extended or adjusted under 35 U.S.C. 154(b) by 62 days.

(21) Appl. No.: 14/356,086

(22) PCT Filed: Nov. 2, 2012

(86) PCT No.: PCT/JP2012/078487
§ 371 (c)(1),
(2) Date: May 2, 2014

(87) PCT Pub. No.: WO2013/065826
PCT Pub. Date: May 10, 2013

(65) Prior Publication Data
US 2014/0322996 A1    Oct. 30, 2014

(30) Foreign Application Priority Data
Nov. 4, 2011   (JP) .................... 2011-242677

(51) Int. Cl.
B63H 9/00       (2006.01)
B63H 13/00      (2006.01)
B63H 1/04       (2006.01)
F03B 13/16      (2006.01)
(Continued)

(52) U.S. Cl.
CPC .............. B63H 1/04 (2013.01); B63B 35/44 (2013.01); B63H 5/07 (2013.01); B63H 9/06 (2013.01);
(Continued)

(58) Field of Classification Search
CPC ... B63H 1/00; B63H 9/00; B63H 1/04; B63H 9/06; B63H 5/00; B63H 5/07;
(Continued)

(56) References Cited

U.S. PATENT DOCUMENTS 2,261,434 A    11/1941  Dorr
4,630,996 A    12/1986  Masaki
(Continued)

FOREIGN PATENT DOCUMENTS

CN    1207354      2/1999
CN    101589223    11/2009
(Continued)

OTHER PUBLICATIONS

International Search Report dated Feb. 5, 2013 issued in corresponding application No. PCT/JP2012/078487.

*Primary Examiner* — Daniel V Venne
(74) *Attorney, Agent, or Firm* — Westerman, Hattori, Daniels & Adrian, LLP

(57) ABSTRACT

Provided are a floating structure fluid dynamic force use system and a wind-propelled vessel which uses the system whereby it is possible to compensate for overturning moment due to fluid dynamic force and to alleviate both tilting and size increases of a floating structure. A floating structure fluid dynamic force use system (1) comprises an assembly (12) which extracts energy from wind or water, and a floating structure (13) which supports the assembly (12). The assembly (12) comprises a wind receiving part (10) which receives fluid dynamic force, and a support column (11) which supports the wind receiving part (10). The assembly (12) is positioned with the center of gravity (15) thereof below the water line and is supported to be capable of tilting in an arbitrary direction upon the floating structure (13).

17 Claims, 19 Drawing Sheets

(51) Int. Cl.
    *F03B 13/18*    (2006.01)
    *B63H 9/06*     (2006.01)
    *B63H 5/07*     (2006.01)
    *F03B 3/00*     (2006.01)
    *F03D 5/00*     (2006.01)
    *B63B 35/44*    (2006.01)
    *F03D 13/20*    (2016.01)

(52) U.S. Cl.
    CPC ............ *B63H 13/00* (2013.01); *F03B 3/00* (2013.01); *F03B 13/16* (2013.01); *F03B 13/182* (2013.01); *F03D 5/00* (2013.01); *F03D 13/22* (2016.05); *B63B 2035/446* (2013.01); *B63B 2035/4466* (2013.01); *F05B 2240/913* (2013.01); *F05B 2240/93* (2013.01); *F05B 2240/95* (2013.01); *F05B 2250/42* (2013.01); *Y02E 10/38* (2013.01); *Y02E 10/727* (2013.01); *Y02E 10/728* (2013.01)

(58) Field of Classification Search
    CPC ....... B63H 13/00; B63H 13/06; F03D 11/045; F03D 5/00; F03D 1/001; F03B 13/16; F03B 13/182; F03B 3/00; F05B 2240/913; F05B 2240/93; F05B 2240/95; F05B 2240/42; Y02E 10/38; Y02E 10/727; Y02E 10/728
    USPC ................... 440/8; 114/258–267; 29/525.01
    See application file for complete search history.

(56) References Cited

U.S. PATENT DOCUMENTS

| | | | | |
|---|---|---|---|---|
| 7,100,438 B2* | 9/2006 | LeMieux | ................ | B63B 39/00 290/55 |
| 7,156,037 B2* | 1/2007 | Borgen | ................... | E02D 27/42 114/264 |
| 7,242,107 B1* | 7/2007 | Dempster | ............... | B63B 21/22 290/42 |
| 7,566,983 B1 | 7/2009 | Lyatkher | | |
| 7,612,462 B2* | 11/2009 | Viterna | ................... | B63B 21/50 290/42 |
| 7,726,911 B1* | 6/2010 | Dempster | ............... | B63B 35/44 114/256 |
| 7,948,101 B2* | 5/2011 | Burtch | ...................... | C25B 1/04 290/43 |
| 8,057,127 B2* | 11/2011 | Lopez | ................... | F03D 1/001 114/264 |
| 8,118,538 B2* | 2/2012 | Pao | ........................ | B63B 21/50 415/115 |
| 9,003,631 B2* | 4/2015 | Yamamoto | ............. | F03D 1/001 29/525.01 |
| 2003/0168864 A1* | 9/2003 | Heronemus | ............. | F03D 9/00 290/55 |
| 2010/0164227 A1 | 7/2010 | Grassi | | |

FOREIGN PATENT DOCUMENTS

| | | |
|---|---|---|
| JP | 58-64867 U | 5/1983 |
| JP | 60-67786 A | 4/1985 |
| JP | 2001-241374 A | 9/2001 |
| JP | 2002-285951 A | 10/2002 |
| JP | 2008-63961 A | 3/2008 |
| JP | 2009-30586 A | 2/2009 |
| JP | 2009-248792 A | 10/2009 |
| JP | 2010-30379 A | 2/2010 |
| JP | 2010-511115 A | 4/2010 |
| JP | 2010-216273 A | 9/2010 |
| RU | 2378531 C1 | 1/2010 |
| SU | 1321904 A1 | 7/1987 |

* cited by examiner

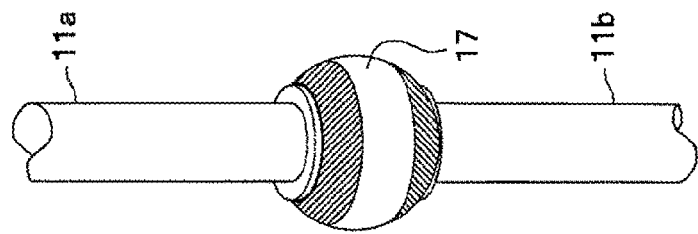
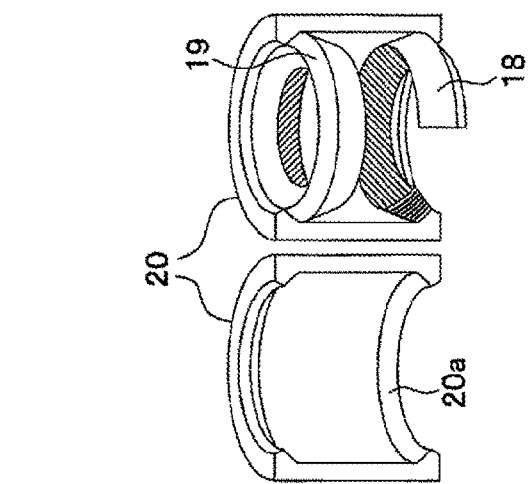
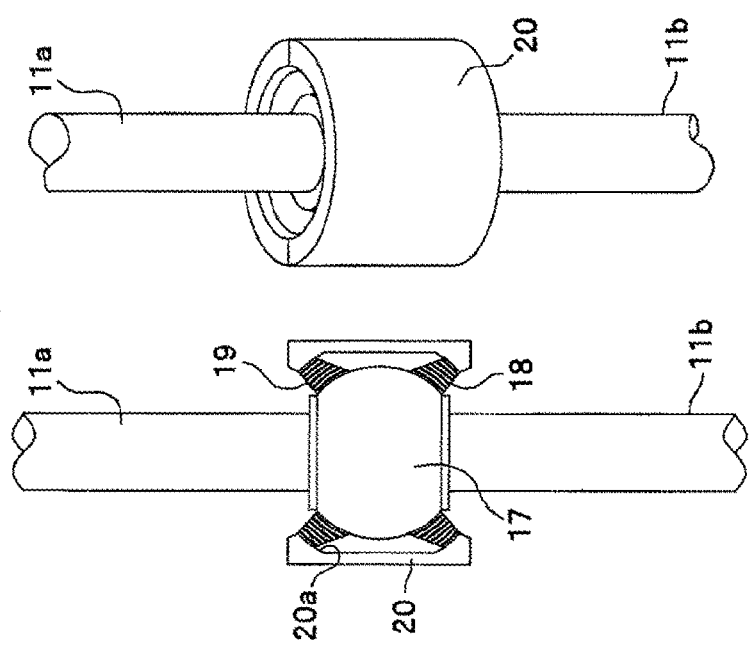
Fig. 3(a)
Fig. 3(b)
Fig. 3(c)

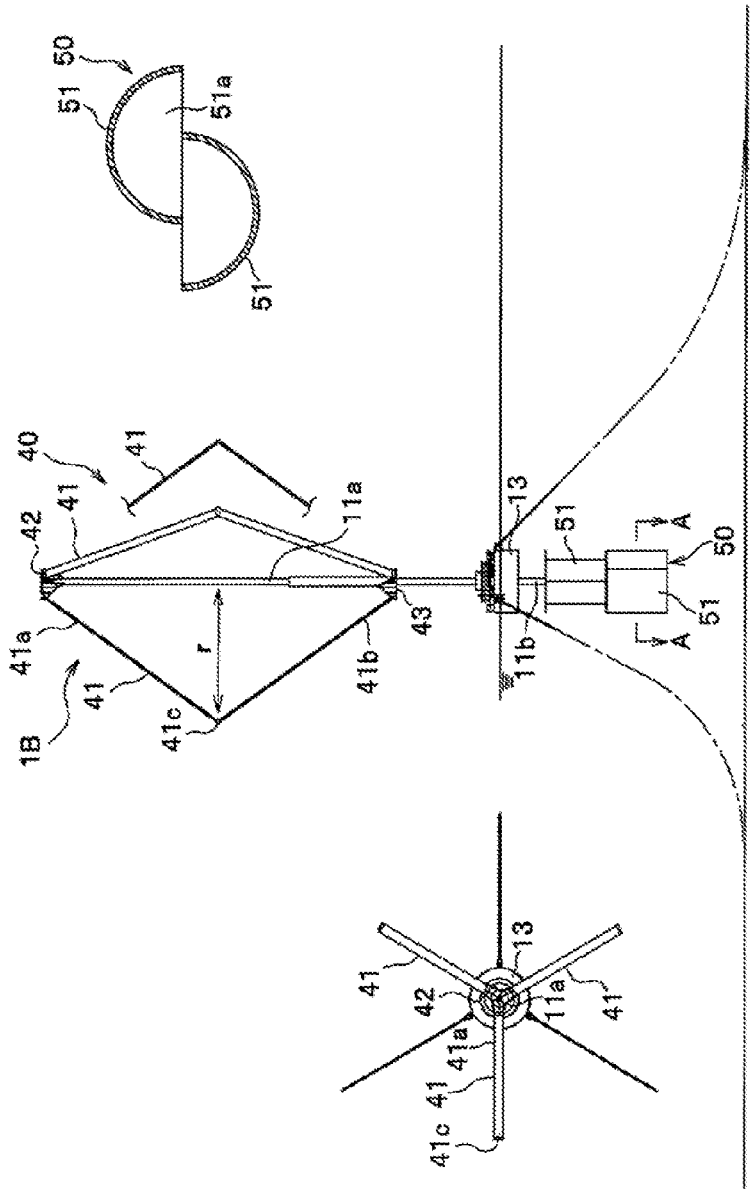

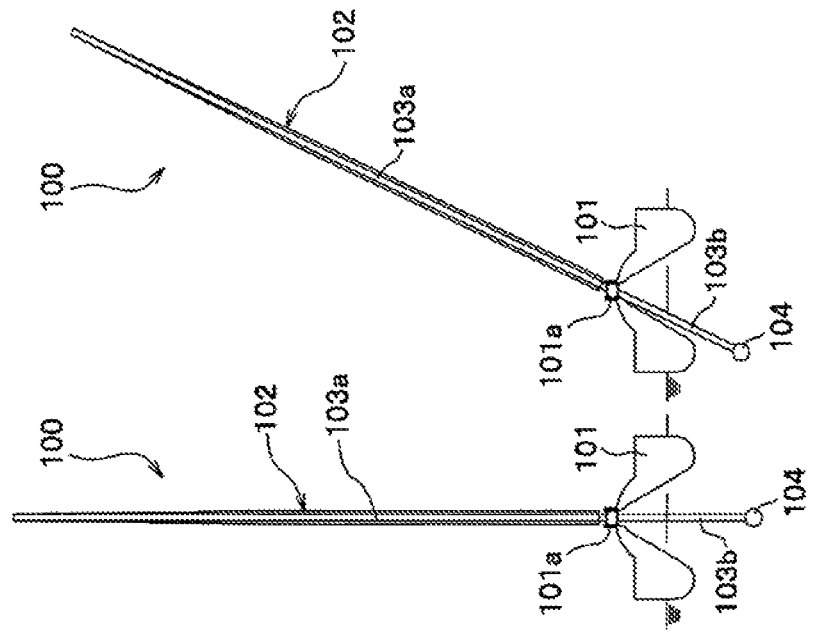

FLOATING STRUCTURE FLUID DYNAMIC FORCE USE SYSTEM AND WIND-PROPELLED VESSEL

TECHNICAL FIELD

The present invention relates to a floating structure fluid dynamic force use system which can be used for a rolling marine vessel or offshore structure and a wind-propelled vessel using the same.

BACKGROUND ART

As a wind power generation system, the horizontal-axis wind turbines are widely used on land. Countries with matured wind turbine market have faced shortage of sites suitable for installing wind turbines with sufficient wind energy. Hence, in such countries, it is necessary to install wind turbines offshore where stable wind force can be obtained and large areas are available. However, as of now, wind turbines have been installed offshore only by a method in which, as in the case on land, a wind turbine is installed on foundation onto a seabed in a sea area near a coastline with an extremely shallow water depth of about 10 m.

Since there is an expectation for further increase of the offshore installation in the future, development of a practical method for installing a wind turbine as a floating structure is demanded. Since electric power is generally required on land, the electric power has to be supplied to land through electric wires. To reduce loss during the transmission, the wind turbine has to be installed near land, and has to be installed in a shallow sea area. For a wind power generation system having a floating structure, which is expected as a next-generation offshore wind turbine installation method, a method is first desired which enables economical installation in a shallow sea area with a water depth of about 20 to 30 m.

When a wind turbine converts wind energy to rotation force, the wind turbine receives a strong wind force. The strong wind force generates a moment which causes the wind turbine to turn over. The horizontal-axis wind turbine, which is developed on land, receives the wind force at one point by a horizontal shaft supported at a high position in the air. Hence, a huge overturning moment is generated at the root of a vertical support column of the horizontal-axis wind turbine. In the horizontal-axis wind turbine, the wind turbine is attached to rotate around the vicinity of an upper end of the wind turbine support column, and the wind turbine has to continue to change its orientation so that the wind turbine can always face the wind. Hence, it is impossible to provide guy-wires for supporting the support column in order to receive the above-described huge moment. Accordingly, the support column of the horizontal-axis wind turbine has to be fixed to the ground as firm as possible, and it is difficult to rotate the wind turbine together with the support column to change the direction of the wind turbine. If a turntable was provided on the ground level, the overturning moment of the support column cannot be received, unless the diameter of the turntable is excessively increased. For this reason, in general, the turntable of a horizontal-axis wind turbine is provided immediately below a nacelle provided in an upper end of the support column. Meanwhile, to provide functions necessary for a horizontal-axis wind power generation, it is necessary to provide devices, such as a horizontal-axis bearing support system, a step-up gear, a power generator, a brake, and a blade pitch control device, around the rotation axis of the wind turbine. These devices are desirably provided closer to the wind turbine than the turntable, in order to avoid fluctuation in the rotation torque and interference with the rotation of the turntable. Not only all these major devices, but also peripheral devices including a lubricant oil system, a control panel, and the like are provided in the nacelle in the air. Consequently, the center of gravity of the horizontal-axis wind turbine is located at an extremely high position. In addition, when the horizontal-axis wind turbine is attached firmly to a floating structure, rolling centered at the floating structure is amplified at the upper end of the support column, and then an excessive lateral G force is generated. Hence, it is disadvantageous that the devices disposed in the nacelle have to have strengths, lubrication systems, and the like for withstanding such lateral G force.

FIG. 17 schematically shows, as Comparative Example 1, a relationship between inclination and stability moment in a case where a horizontal-axis wind turbine is placed on a floating structure.

In general, in order for a floating structure to have a stability moment, the center of gravity needs to be at a position lower than the metacenter (the intersection of the buoyancy line and the center line of the floating structure) located near the floating structure. In a horizontal-axis wind turbine 200 configured as described above, heavy devices are all located at high positions in the air, and hence the center of gravity G is so high that the horizontal-axis wind turbine 200 cannot have stability moment. Suppose a case where the horizontal-axis wind turbine 200 of a construction as provided on land is installed by fixation to a floating structure 201. In such a case, even if the inclination of the floating structure 201 is slight, the gravity force F1 acts outside the buoyancy F2 acting on the floating structure 201, because of the high center of gravity G as shown in FIG. 17. Hence, a force acts to further incline the floating structure 201. Moreover, the floating structure 201 receives a huge and fluctuating overturning moment, because of a wind force F3 received at a high position as shown in FIG. 17.

In other words, since the floating structure 201 does not have a necessary stability moment, and receives a huge and fluctuating overturning moment because of the wind force F3, there is a problem that such a structure is impractical as a floating structure.

To solve these problems, it is necessary to provide all the major devices at low positions on the floating structure, so that the center of gravity G and work areas for the maintenance are lowered as much as possible.

In the case of the horizontal-axis wind turbine 200, the turntable has to be disposed at an upper end of the wind turbine support column 202, unless the necessity for the firm fixation of the wind turbine support column 202 to the floating structure 201 as seen in the example of the land wind turbine earlier can be eliminated. Consequently, all the upstream devices are placed in the nacelle 203 above the turntable, and hence it is difficult to lower the center of gravity G.

FIGS. 18(a)-(c) schematically show, as Comparative Example 2, a relationship between inclination and stability moment in a case where a vertical-axis wind turbine is placed on a floating structure, where FIG. 18(a) shows a state with a slight inclination, FIG. 18 (b) shows a state with an increased inclination, and FIG. 18(c) shows a state with a further increased inclination.

In contrast to the horizontal-axis wind turbine 200 of Comparative Example 1, the center of gravity G of a vertical-axis wind turbine 300 as shown in FIGS. 18(a)-18(c) should be lowered to a great extent, because all heavy devices can be provided not high in the air but on the floating structure 301 as in the case of the ground where the heavy devices are provided on a base in general. However, as seen in an example on land, in a case of a vertical-axis wind turbine 300 in which the support column 302 itself rotates with a rotor, it is difficult to fix the support column 302 in such a manner as to withstand an overturning moment due to a wind force F3, and it is necessary to provide guy-wires (not illustrated) in four directions to support an upper end of the support column 302. This necessitates a floating structure having a wide deck surface not smaller than a size necessary for a buoyant body. In addition, aside from the problem of the guy-wires, the lowering of the center of gravity to this extent causes the following problem. Specifically, when the inclination of the floating structure 301 due to the wind force F3 or the like is small as shown in FIG. 18(a), a stability moment is exerted because the amount of the lateral shift of the buoyancy center C is larger than the amount of the lateral shift of the center of gravity G by the inclination. As the inclination further increases, as shown in FIG. 18(b), the lateral shift of the center of gravity G eventually becomes equal to the lateral shift of the buoyancy center C, and the stability moment is lost. With further inclination, a force to cause further inclination acts as shown in FIG. 18(c). To put it differently, there is a problem that the stability moment is lost and the floating structure 301 is overturned, when the inclination angle exceeds a certain value. This is a phenomenon occurring because of the following reason. Specifically, when the center of gravity G is located above the floating structure 301, the center of gravity G is shifted laterally, as the inclination increases. Here, since the buoyancy center C cannot be located outside the floating structure, the lateral shift of the center of gravity G exceeds the lateral shift of the buoyancy center C. This problem is unavoidable, unless the center of gravity G is located not higher than the waterline of the floating structure 301.

FIG. 19 schematically shows, as Comparative Example 3, a relationship between inclination and stability moment in a case where a vertical-axis wind turbine is supported to be incapable of tilting with respect to the floating structure, and a ballast is provided in water.

For an ordinary yacht, a stability system has been achieved in which a ballast is provided in water so that a stability moment is exerted with any inclination. By applying such a stability system of a yacht, a vertical-axis wind turbine 400 is conceivable in which, a support column 403 is supported to be incapable of tilting with respect to a floating structure 401, and a ballast 402 is provided in water, as shown in FIG. 19. The vertical-axis wind turbine 400 can be achieved because the center of gravity G is lower than the rotation center (buoyancy center C) of the inclination movement in the vicinity of the floating structure 401. However, in this form, an excessive stress is placed on a joint part 401a of the support column 403 to the floating structure 401, and hence it is impractical to support the support column 403 by the joint part 401a alone. This form can be achieved only when wires (not illustrated) called forestay or sidestay supporting the support column 403 are provided in three or four directions, as in the case of the guy-wires of the vertical-axis wind turbine on land. In addition, when this structure is directly applied to a wind power generation system operated while moored offshore, operators are exposed to danger because the floating structure 401 is greatly inclined with the support column 403. In addition, the load on the mooring system which is influenced by the inclination of the floating structure 401 excessively increases particularly in shallow areas.

Various methods have been studied for overcoming the insufficiency in the stability moment of such a floating structure. Examples of proposed methods include a method in which multiple horizontal-axis wind turbines are all disposed on a single huge floating structure; a method in which multiple horizontal-axis wind turbines are disposed and floating structures supporting the horizontal-axis wind turbines, respectively, are rigidly joined to each other (see, for example, Patent Document 1); a method in which the stability is obtained by using a floating structure, called a spar, having a cylindrical shape elongated in the longitudinal direction and extending deep under the water (see, for example, Patent Document 2), a method called TLP in which a floating structure is stabilized by being pulled toward the seabed by metal pipes called tendons or the like (see, for example, Patent Document 3); and the like.

However, each of the methods has such a drawback that the size of the floating structure is too large relative to the amount of energy harvested by the system from wind force, and hence the construction costs and the installation costs are too much, which make the method economically impractical. Moreover, each of the methods is based on a concept in which a certain water depth is necessary, considering the change in draft of the huge structure due to rolling, the draft of the vertically elongated structure, the geometric movement range of the tendons pulling in the longitudinal direction, and the like. Hence, these methods have such a drawback that these methods are unsuitable for installation in shallow areas near land where the electric power is required as mentioned above.

PRIOR ART DOCUMENT

Patent Document

Patent Document 1: Japanese patent application Kokai publication No. 2010-216273

Patent Document 2: Japanese patent application Kokai publication No. 2009-248792

Patent Document 3: Japanese patent application Kokai publication No. 2010-030379

SUMMARY OF THE INVENTION

Problem to be Solved by the Invention

The present invention has been made in view of the above-described circumstances, and an object of the present invention is to provide a floating structure fluid dynamic force use system which can cape with overturning moment due to fluid dynamic force and suppress inclination and upsizing of a floating structure, and a wind-propelled vessel using the floating structure fluid dynamic force use system.

Means for Solving the Problem

The present invention provides a floating structure fluid dynamic force use system including: an assembly for extracting energy from wind or water; and a floating structure supporting the assembly, wherein the assembly includes a force-receiving part for receiving fluid dynamic force and a support column supporting the force-receiving part, and the assembly has a center of gravity set below water and is supported tiltably with respect to the floating structure.

According to the present invention, the center of gravity of the assembly is set below water, and the assembly is supported tiltably with respect to the floating structure.

Hence, the assembly is inclined upon reception of a fluid dynamic force, while a gravity force acting on the center of gravity present below water generates a stability moment which is centered at a supporting part of a tilting shaft and which acts to correct the inclination. As the inclination increases, the stability moment increases, and is never lost. Hence, the assembly itself can cope with the overturning moment of the assembly. For this reason, the floating structure does not have to share the overturning moment, and hence it is unnecessary to provide guy-wires, so that the size of the floating structure can be reduced. Moreover, since the assembly is supported tiltably with respect to the floating structure, the inclination of the assembly does not cause inclination of the floating structure.

Note that, it is conceivable that any of a sail, a fixed blade, and a horizontal or vertical wind turbine, which receive wind, a tidal flow force sail, a keel, a horizontal or vertical water turbine, which receive tidal flow force, and the like is used as the force-receiving part.

In addition, a configuration may be employed in which the assembly is supported swingably with respect to the floating structure with any one of a pin joint, a universal joint, a pillow ball spherical bearing, and an elastic body support mechanism provided therebetween.

According to this configuration, an assembly having a heavy weight can be supported by a floating structure in a simple and reliable manner, while being allowed to swing.

Moreover, a configuration may be employed in which the assembly is supported rotatably around a center axis of the support column with respect to the floating structure.

According to this configuration, when the force-receiving part is of a type which has to rotate, the force-receiving part is allowed to rotate, while the entire assembly is being integrally assembled.

In addition, a configuration may be employed in which at least wind force is used as the fluid energy, the force-receiving part includes a wind-receiving part for receiving the wind force in the air, and the support column includes an upper support column supporting the wind-receiving part and a lower support column supporting a ballast set below water.

According to this configuration, the force-receiving part includes the wind-receiving part for receiving the wind force in the air, and the support column includes the upper support column supporting the wind-receiving part and the lower support column supporting a ballast set below water. Hence, while the wind-receiving part and the ballast are supported by the support column set so as to penetrate through the floating structure, the entire assembly can be supported tiltably and rotatably with respect to the floating structure.

Note that, for example, when the wind-receiving part is a fixed blade, it is necessary to change the direction of the force-receiving part according to the direction of the wind. In this respect, if the ballast keeping the balance in water has a cylindrical or spherical shape (a shape rotationally symmetric with respect to the rotation axis of the support column), the upper support column holding the force-receiving part in the air and the lower support column holding the ballast in water can be integrated with each other.

In addition, a configuration may be employed in which the upper support column and the lower support column are connected to each other coaxially rotatably relative to each other in a rigid state with respect to a center axis of the support column with a bearing provided therebetween.

According to this configuration, the upper support column and the lower support column are connected to each other coaxially rotatably relative to each other in a rigid state with respect to the center axis of the support column with the bearing provided therebetween. Hence, the lower support column and the ballast can be configured not to rotate even when the upper support column and the force-receiving part are rotating. For this reason, for example, it is possible to prevent the lower support column and the ballast from catching floating objects. In addition, for example, also when a fixed blade is provided above the water surface and a keel and a ballast are provided below water, these can be kept at optimal angles.

In addition, the force-receiving part preferably includes a horizontal-axis wind turbine or a vertical-axis wind turbine.

According to the configuration, even when the force-receiving part is constituted of a horizontal-axis wind turbine or a vertical-axis wind turbine, the center of gravity of the assembly is set below water, and the entire assembly including the wind turbine is supported tiltably with respect to the floating structure. Hence, the assembly can cope with the overturning moment and suppress the inclination and upsizing of the floating structure.

Moreover, a configuration may be employed in which the force-receiving part includes a horizontal-axis water turbine or a vertical-axis water turbine, and the horizontal-axis water turbine or the vertical-axis water turbine is set below water and functions as a ballast or part of a ballast.

According to this configuration, even when the force-receiving part is constituted of a horizontal-axis water turbine or a vertical-axis water turbine, the center of gravity of the assembly is set below water, and the entire assembly including the water turbine is supported tiltably with respect to the floating structure. Hence, the overturning moment can be coped with, and the inclination and upsizing of the floating structure can be suppressed.

In addition, since the horizontal-axis water turbine or the vertical-axis water turbine functions as a ballast or part of a ballast, it is unnecessary to provide a ballast separately, and the structure can be simplified. Moreover, it is possible to employ a configuration in which a wind turbine and the water turbine are provided in upper and lower potions of the support column.

In addition, a configuration may be employed in which the upper support column and the lower support column are connected to each other with a gear system provided therebetween so as to coaxially rotate while keeping a predetermined relative rotational relationship, and are supported rotatably and swingably relative to the floating structure.

According to this configuration, the upper support column and the lower support column are connected to each other with the gear system provided therebetween. Hence, the two rotate coaxially with each other while keeping a predetermined relative rotational relationship. Therefore, it is possible to employ a configuration by which, when the design tidal flow rate and the design wind speed are different from each other, energy can be extracted from the wind turbine and the water turbine which are rotated at their numbers of revolutions at which the wind turbine and the water turbine are efficient. For example, suppose a case where such a configuration is employed in which the wind-receiving part is a vertical-axis wind turbine, the ballast part is a vertical-axis water turbine, and the upper support column and the lower support column are connected with each other with bearings and a planetary gear system or a differential gear system provided therebetween, while being rigid with respect to the axis, so that the upper support column and the wind-receiving part are rotated multiple times, during a single rotation of the lower support column and the vertical-axis water turbine. In such a case, the energy can be efficiently extracted from the both.

Moreover, a configuration may be employed in which the upper support column and the lower support column have a mechanism by which rotation of one of the upper support column and the lower support column is transmitted to the other under a predetermined condition, while rotation of one of the upper support column and the lower support column is not transmitted to the other under another condition.

According to this configuration, by incorporating, for example, a ratchet gear, a clutch, a viscous coupling, a torque limiter, or the like between the upper support column and the lower support column, the rotations can be independent from each other, the rotation can be transmitted only in one direction, overspeed can be prevented, or relative rotation can be locked.

In addition, a configuration may be employed in which the assembly includes a rotation energy extraction part for extracting rotation energy from rotation of the force-receiving part, the upper support column and the lower support column are configured to rotate coaxially with each other in directions opposite from each other, and the rotation energy extraction part is set so as to enable torques generated upon extraction of rotation energies from the upper support column and the lower support column to cancel each other.

According to this configuration, the upper support column and the lower support column are configured to rotate coaxially with each other in directions opposite from each other, and the rotation energy extraction part is attached so as to enable torques generated upon the extraction of the energies to cancel each other. Hence, the rotation of the floating structure and the load on the mooring system of the floating structure can be reduced.

More specifically, for example, when energy is extracted from a water turbine rotating, for example, clockwise when viewed from above to the floating structure, a torque to rotate the floating structure clockwise is generated. Likewise, when energy is extracted from vertical-axis rotation of a wind turbine, a torque to rotate the floating structure together is generated. In these cases, the floating structure rotates, and a mooring system thereof is twisted. In some cases, the tension of the mooring system increases because the mooring system is wound around side faces of the floating structure. The rotation of the floating structure does not stop until a balance is reached by generating a counter torque which counteracts the torque. This causes excessive bending, fatigue, wearing in constituents of the mooring system. In this respect, as in the present invention, for example, the travel directions of the blades of the vertical-axis wind turbine and the vertical-axis water turbine are set, or a counter rotation gear system is provided between the upper support column and the lower support column, so that, for example, the lower support column provided with the water turbine and the upper support column provided with the wind turbine can always rotate in opposite directions. In such a case, the torques are cancelled with each other, and the problem can be solved or reduced.

In addition, a configuration may be employed in which the rotation energy extraction part is a power generator including a rotor and a stator, the rotor is connected to any one of the upper support column and the lower support column, while the stator is connected to the other, and the power generator generates electric power based on differential motion between the rotor and the stator.

According to this configuration, the rotor is connected to one of the upper support column and the lower support column, while the stator is connected to the other, and electric power is generated based on differential motion. When rotation energy is converted to electric power and extracted, this configuration makes it possible to cancel the torques with each other and use a smaller power generator because a relatively high number of revolutions can be achieved, so that, for example, the number of poles of the power generator can be reduced.

In addition, a configuration may be employed in which the force-receiving part includes a vertical-axis wind turbine driven by a lift force (hereinafter, "lift-type vertical-axis wind turbine") and a vertical-axis water turbine driven by a drag force (hereinafter, "drag-type vertical-axis water turbine"), and the vertical-axis wind turbine is activated by rotation of the vertical-axis water turbine.

According to this configuration, a lift-type vertical-axis wind turbine, which is generally poor in self-starting property, can be activated by a drag-type vertical-axis water turbine having relatively good starting property. In addition, since the vertical-axis water turbine is provided below water, the wind flow blowing to the vertical-axis wind turbine is not disturbed, and the reduction in rotation efficiency of the wind turbine can be suppressed.

More specifically, among vertical-axis wind turbines, lift-type wind turbines typified by the Darrieus wind turbines are generally efficient, and have an advantage that the lift-type wind turbines do not require any adjustment in wind blowing in any wind direction. However, lift-type wind turbines have a disadvantage that the lift-type wind turbines cannot be started by themselves, but requires rotation during the start. To overcome this disadvantage, a gyromill wind turbine is developed which can be started by itself by adding a link mechanism by which angles of attack are varied among positions such as an upwind position and a downwind position. However, the gyromill wind turbine requires an adjustment made according to the direction of the wind and the relationship between the rotation speed and the wind speed. Moreover, the lift-type wind turbines have such a drawback that the mechanism is mounted at a position beyond the reach, and hence the maintenance of the mechanism is difficult in offshore. An approach has been put to practical use in which the insufficiency in self-starting force is supplemented by employing a Darrieus wind turbine as a main rotor, and in combination a Savonius wind turbine, which has a low efficiency but has a good starting characteristic, or the like is disposed inside the Darrieus wind turbine. However, this approach has such a drawback that the Savonius wind turbine disturbs the wind flow blowing to the Darrieus wind turbine and decreases the efficiency. In the present invention, for example, a Darrieus wind turbine is used, and the Darrieus wind turbine can be started by using a Savonius water turbine for the tidal flow force under the water surface. With this configuration, the Savonius water turbine does not disturb the fluid flow blowing to the Darrieus wind turbine.

Moreover, a configuration may be employed in which the force-receiving part includes a lift-type vertical-axis wind turbine and a drag-type vertical-axis water turbine, the vertical-axis water turbine is connected to the vertical-axis wind turbine with a step-up device provided therebetween, and the step-up device transmits rotation of the vertical-axis wind turbine to the vertical-axis wind turbine when a rotation speed of the vertical-axis wind turbine after stepping up is not higher than the rotation speed of the vertical-axis water turbine, but does not transmit the rotation of the vertical-axis wind turbine to the vertical-axis water turbine when the rotation speed of the vertical-axis wind turbine after stepping up is higher than the rotation speed of the vertical-axis water turbine.

According to this configuration, the rotation of the vertical-axis water turbine is transmitted to the vertical-axis wind turbine when the rotation speed of the vertical-axis wind turbine after stepping up is not higher than the rotation speed of the vertical-axis water turbine. Hence, the activation property of the lift-type vertical-axis wind turbine can be enhanced. Meanwhile, the rotation of the vertical-axis wind turbine is not transmitted to the vertical-axis water turbine, when the rotation speed of the vertical-axis wind turbine after stepping up is higher than the rotation speed of the vertical-axis water turbine. Hence, the vertical-axis water turbine does not act as a resistance.

More specifically, in general, the design speed of tidal flow is greatly lower than the design wind speed of wind. Moreover, a Savonius rotor is efficient when the peripheral speed of a maximum diameter part of the rotor is about equal to the fluid speed, whereas a Darrieus rotor is efficient when the peripheral speed is about 4 to 6 times the wind speed. Hence, the axial rotation of the Savonius water turbine is preferably transmitted to the axial rotation of the Darrieus wind turbine after stepped up. Meanwhile, when the wind speed increases, it is preferable that the axial rotation of the wind turbine be separated from the rotation transmission, so that the water turbine does not serve as a brake, or the transmission be conducted only in one direction. Note that since the tidal flow rate is generally quite low, but water has a specific gravity 800 times as high as that of air, a Darrieus wind turbine in the air can be started by disposing a Savonius water turbine for start-up in water having a size about the same as that of a Savonius wind turbine for activation disposed in the air. This configuration is especially useful in sea areas, including sea areas near Japan, which have such characteristics that the tidal flow has a low flow rate but is relatively frequent, that the wind speed is fast when a wind blows but wind often dies down, and that the direction of the wind is not constant, and the like.

Moreover, a configuration may be employed in which the assembly has a buoyancy about equal to own weight of the assembly and is supported vertically movably with respect to the floating structure, and a vertical-movement energy extraction part is provided for extracting energy from relative vertical movement between the assembly and the floating structure.

According to this configuration, the assembly has a buoyancy about equal to own weight of the assembly and is supported vertically movably with respect to the floating structure. Hence, when the buoyancies acting on the two fluctuate because of a wave, the two move vertically relative to each other because of the difference in followability of the floating structure with respect to the two. Then, the vertical-movement energy extraction part extracts energy (wave energy) from the relative vertical movement between the floating structure and the assembly.

Note that the assembly undergoes relatively small change in buoyancy due to draft fluctuation, and vertically travel with a long period, because of its relatively large weight and its relatively slim water surface penetration part. Meanwhile, the floating structure follows waves well, because of its relatively small weight and the large water surface penetration part. Hence, the relative vertical movement is generated by waves.

Moreover, a configuration may be employed in which the vertical-movement energy extraction part is a linear generator including a translator and a stator, the translator is connected to any one of the assembly and the floating structure, while the stator is connected to the other, and the linear generator generates electric power based on differential motion between the translator and the stator.

According to this configuration, the vertical-movement energy extraction part is a linear generator including a translator and a stator, and, in the linear generator, the translator is connected to any one of the assembly and the floating structure, while the stator is connected to the other. Hence, electric power can be generated directly from the relative vertical movement between the assembly and the floating structure.

Moreover, a configuration may be employed in which the vertical-movement energy extraction part includes a rotation force conversion mechanism including any one of a ball screw, a rack and pinion, a connecting rod-crank mechanism, and a gyro.

According to this configuration, the rotation force conversion mechanism such as a ball screw, a rack and pinion, a connecting rod-crank mechanism, or a gyro converts the vertical movement to rotation. Hence, the vertical movement energy can be used for power generation in a more efficient rotation-type power generator.

Moreover, a configuration may be employed in which the force-receiving part includes at least any one of a lift-type vertical-axis wind turbine and a vertical-axis wind turbine driven by a lift force (hereinafter, "lift-type vertical-axis water turbine"), and is activated by rotation force obtained by the rotation force conversion mechanism.

According to this configuration, the rotation force obtained by the rotation force conversion mechanism can be transmitted to a Darrieus wind turbine or a Darrieus water turbine, and used to start up the Darrieus wind turbine or the Darrieus water turbine. In addition, wind energy and tidal flow force energy can be integrated and used for power generation in a power generator using rotation to generate power (hereinafter "rotation-type power generator").

In addition, the present invention provides a wind-propelled vessel comprising the above-described floating structure fluid dynamic force use system, wherein the floating structure is a hull, the force-receiving part includes a wind-receiving part for receiving wind force in air, the support column includes an upper support column supporting the wind-receiving part and a lower support column supporting a ballast set below water, and the wind-propelled vessel includes a propeller which is set below water and which is rotated by wind force received by the wind-receiving part substantially around a horizontal axis.

According to this configuration, the hull can be propelled by the propeller rotated substantially around the horizontal axis by the wind force received by the wind-receiving part. Here, the assembly including the wind-receiving part and the support column are configured to be tiltable with respect to the hull, and the center of gravity of the assembly is set below water. Hence, even when a wind turbine having a large force-receiving part enough to obtain sufficient thrust is disposed, a safe wind-propelled vessel having sufficient stability moment can be obtained, and the inclination and upsizing of the hull can be suppressed.

Note that, during sailing, the assembly is preferably restricted to be tiltable only in the roll direction of the hull by a restriction device for restricting the tilt direction of the assembly.

Moreover, a configuration may be employed in which the propeller of the wind-propelled vessel is disposed in the ballast.

According to this configuration, for example, the rotation of the vertical-axis wind turbine is stepped up and transmitted to a shaft penetrating the inside of the ballast to the bottom, and converted to horizontal axis rotation by a bevel gear provided inside the ballast. Then, the propeller provided there can be rotated for propelling by the horizontal axis rotation.

Moreover, a configuration may be employed in which the ballast or the lower support column functions as a lift-type keel.

According to this configuration, the ballast or the lower support column functions as a keel that generates lift (hereinafter, "lift-type keel"). Hence, the angle of attack of the keel can be adjusted by the rotation of the lower support column.

More specifically, when a vessel propelled by receiving a large wind energy sails in a crosswind, the vessel sails, while slipping downwind by being pushed by the wind. The same applies for a yacht. In the case of a high-performance yacht, a keel in water has an angle of attack because of a combined velocity of a side-slip velocity and a straight ahead velocity, and the balance is kept because a lift to push the yacht upwind is generated in the keel. However, the balance is reached only when the side slip occurs to a certain degree. Hence, the increase in hull resistance by the side slip is inevitable. In the present invention, the rotatably supported ballast keel system makes it possible to provide an angle of attack to the keel so that a lift to push upwind can be generated in the keel even when no side slip occurs. Hence, the hull can sail straight ahead while facing the travel direction, and the hull resistance can be reduced.

Moreover, a configuration may be employed in which the wind-propelled vessel includes two assemblies, each of which is the assembly, set in a front and a rear of the hull, and the two keels rotate to have angles of attack in the same direction during sailing straight ahead in a crosswind, while the keel in a front end and the keel in a rear end rotate to have angles of attack in directions opposite from each other during turning.

According to this configuration, the two keels rotate to have angles of attack in the same direction during sailing straight ahead in a crosswind, while the keel in the front end and the keel in the rear end rotate to have angles of attack in directions opposite from each other during turning. Hence, a high-performance wind-propelled vessel with a low resistance can be achieved by eliminating a rudder.

Effects of the Invention

As described above, in the floating structure fluid dynamic force use system of the present invention, the assembly having the center of gravity in water is tiltably supported by the floating structure. Hence, the present invention can achieve such effects that overturning moment due to huge and fluctuating fluid dynamic force can be coped with, that the floating structure is not inclined even when the force-receiving part in the air receives a large force and is inclined, so that the stability moment of the floating structure can always be retained, and that safe access for inspection, and the like can be provided to an operator.

Moreover, when the force-receiving part in the air or in water is exposed to an excessive fluid speed, the force-receiving part spontaneously inclines to release the fluid dynamic force. Also in this case, it is possible to achieve such an effect that the floating structure is not inclined and retains stability moment.

Moreover, according to the present invention, since it is unnecessary to dispose guy-wires, the upsizing of the floating structure can be suppressed. Moreover, whichever the wind turbine is one in which the rotating axis is horizontal, or parallel with the ground (hereinafter, "a horizontal-axis type wind turbine") or one in which the rotational axis of the turbine stands vertical or perpendicular to the ground (hereinafter, "a vertical-axis type wind turbine"), most of the major devices such as a gear box, a turntable, and a power generator can be disposed on the floating structure. This facilitates inspection and maintenance, and moreover can reduce work at height using a crane required for installation and operation periods as much as possible.

In addition, since a system which is self-supported and stable even without mooring can be achieved, the system can be towed after being assembled in a quayside. Hence, the installation costs can be greatly reduced. Moreover, by utilizing this characteristic, the present invention can achieve such an effect that a highly efficient and large wind-propelled vessel can be achieved which is provided with a force-receiving facility receiving a buoyancy enough to be a major part of the propulsion and which can sail straight ahead without roll or side slip even in a crosswind.

BRIEF DESCRIPTION OF THE DRAWINGS

FIG. 2(a) shows an upright state, and FIG. 2(b) shows an inclined state.

FIGS. 3(a)-3(c) show a supporting structure swingably supporting the assembly of the first embodiment, where FIG. 3(a) is a cross-sectional view, FIG. 3(b) is a perspective view, and FIG. 3(c) is an exploded perspective view.

FIG. 4(a) shows an upright state, and FIG. 4(b) shows an inclined state.

FIG. 5(a) shows a state before rotation, and FIG. 5(b) shows a state after rotation.

FIG. 6(a) shows an upright state, and FIG. 6(b) shows an inclined state.

FIGS. 7(a)-7(c) schematically show a case where a vertical-axis wind turbine and a vertical-axis water turbine are tiltably supported by a floating structure in a floating structure fluid dynamic force use system according to a third embodiment, where FIG. 7(a) is a side view of an upright state, FIG. 7(b) is a plan view of the upright state, and FIG. 7(c) is a cross-sectional view of the water turbine.

FIG. 8(a) shows an upright state, and FIG. 8B) shows an inclined state.

FIGS. 10(a) and 10 (b) show side views schematically showing a case where a vertical water turbine to be activated by vertical movement is tiltably supported by a floating structure in a floating structure fluid dynamic force use system according to a fourth embodiment, where FIG. 10(a) shows an upright state.

FIG. 11(a) shows an upright state, and FIG. 11(b) shows an inclined state.

FIGS. 12(a)-12(c) schematically show a wind-propelled vessel according to a fifth embodiment, where FIG. 12(a) shows a side view, FIG. 12(b) shows a cross-sectional view of an upright state, and FIG. 12(c) shows a cross-sectional view of an inclined state.

FIG. 13(b) shows a plan view.

FIG. 14(a) shows a constructed state, and FIG. 14(b) shows an inclined state.

FIG. 18(a) shows a state with a slight inclination, FIG. 18(b) shows a state with an increased inclination, and FIG. 18(c) shows a state with a further increased inclination.

MODES FOR CARRYING OUT THE INVENTION

First Embodiment

Figure 1:
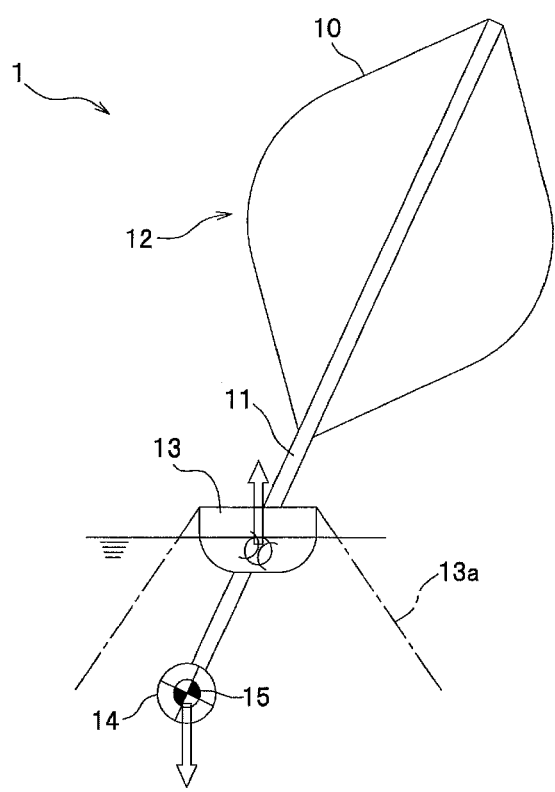
FIG. 1 schematically shows a relationship between inclination and stability moment in a case where a vertical-axis wind turbine is tiltably supported by a floating structure in a floating structure fluid dynamic force use system according to a first embodiment.

A floating structure fluid dynamic force use system 1 according to a first embodiment includes, as shown in FIG. 1, an assembly 12 including a wind-receiving part 10 which is set in the air and which receives wind and a support column 11; and a floating structure 13 tiltably supporting the assembly. The assembly 12 includes a ballast 14 for setting a center 15 of gravity of the assembly 12 below water. The ballast 14 is located at a lower end part of the support column 11. Note that the floating structure 13 is connected to unillustrated anchors with mooring lines 13a.

A supporting structure for tiltably supporting the assembly 12 on the floating structure 13 may be a pin joint, a universal joint, a spherical support, an elastic body support, or the like. In the following description, a case where an elastic body supporting structure is taken as an example is described with reference to FIGS. 2 and 3.

Figure 2A:
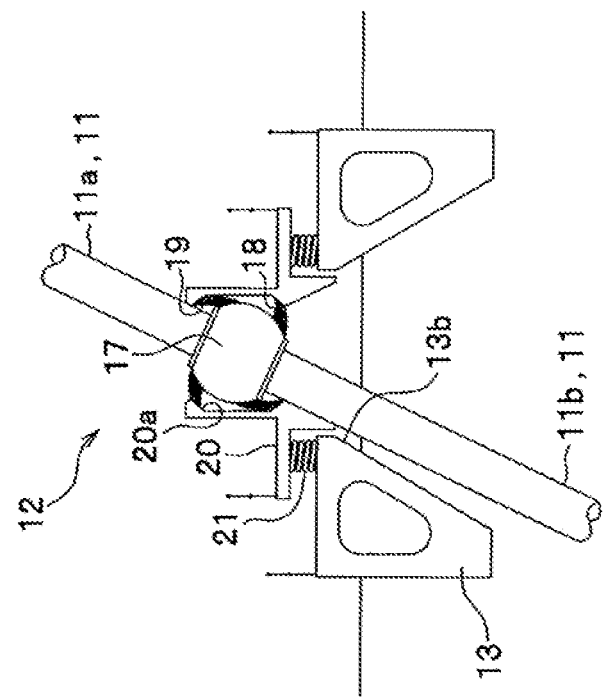
FIGS. 2(a) and 2(b) show enlarged cross-sectional views of a connection part between an assembly and the floating structure of the first embodiment, where
Figure 2B:
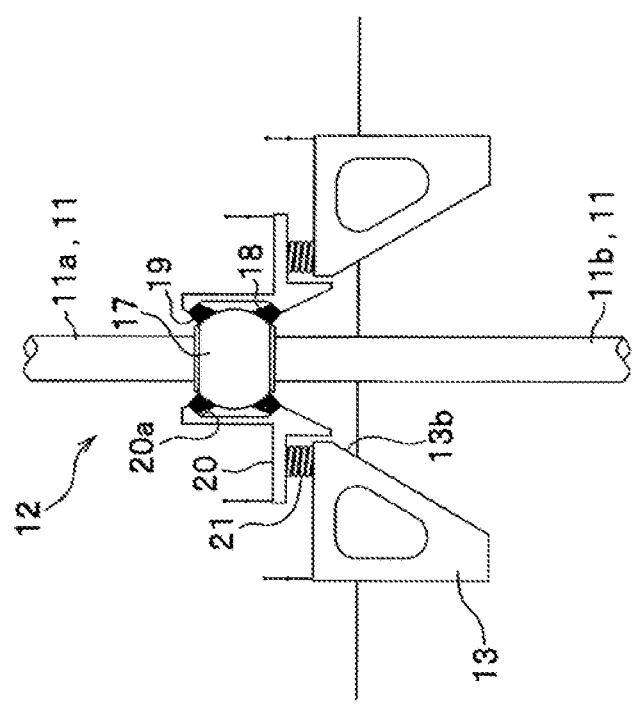

As shown in FIGS. 2(a) and 2(b), the support column 11 includes an upper support column 11a supporting the wind-receiving part 10, a lower support column 11b supporting the ballast 14, and a spherical part 17 provided between the upper support column 11a and the lower support column 11b. The support column 11 is disposed in an opening part 13b provided substantially at a center of the floating structure 13 so as to penetrate the floating structure 13. The opening part 13b is formed into a tapered shape having an inner diameter which increases downward. A support frame 20 for supporting the support column 11 is laid over the opening part 13b.

As shown in FIGS. 2 and 3, the spherical part 17 is mounted on a doughnut-shaped elastic rubber support 18 and bonded thereto by vulcanization. A doughnut-shaped elastic rubber support 19 is mounted also on the spherical part 17 and bonded thereto by vulcanization. Moreover, outer end parts of both of the elastic rubber supports 18 and 19 are bonded by vulcanization to a spherical inner surface 20a of the support frame 20. The spherical inner surface 20a is formed in a spherical shape concentric with the spherical part 17.

The elastic rubber supports 18 and 19 are, for example, members used for seismic base isolation supports of buildings, and each include rubber plates and metal plates stacked in a direction (a radial direction of the spherical part 17) schematically shown in a cross-sectional view of FIG. 3 (a). The elastic rubber supports 18 and 19 have such a characteristic that the elastic rubber supports 18 and 19 deform flexibly in response to shearing force, but have high rigidity under compression. Hence, vertical movement, horizontal movement, and the like of the spherical part 17 are strongly restricted because of the compression characteristic of the doughnut-shaped rubber. However, the spherical part 17 is flexibly supported with respect to the rotation around a rotation center, which coincides with the center of the spherical part 17 and the spherical inner surface 20a, because of the shear deformation characteristic of the doughnut-shaped rubber. For this reason, as shown in FIG. 2 (b), the assembly 12 can be supported tiltably with respect to the floating structure 13.

As shown in FIGS. 2(a) and 2(b), the support frame 20 is connected to the floating structure 13 with coil springs 21 provided therebetween to flexibly support the assembly 12, which would otherwise tilt to a range exceeding the design tilt range. Note that the coil springs 21 are provided, only when necessary, and may be omitted.

Second Embodiment

A floating structure fluid dynamic force use system 1A according to a second embodiment is different from that of the above-described first embodiment mainly in that a horizontal-axis wind turbine 30 is employed as a force-receiving part and that the upper support column 11a and the lower support column 11b are connected to each other in a relatively rotatable manner.

In the following description, differences from the first embodiment are mainly described, and common elements are denoted by the same reference numerals and are not described.

Figures 4A, 4B:
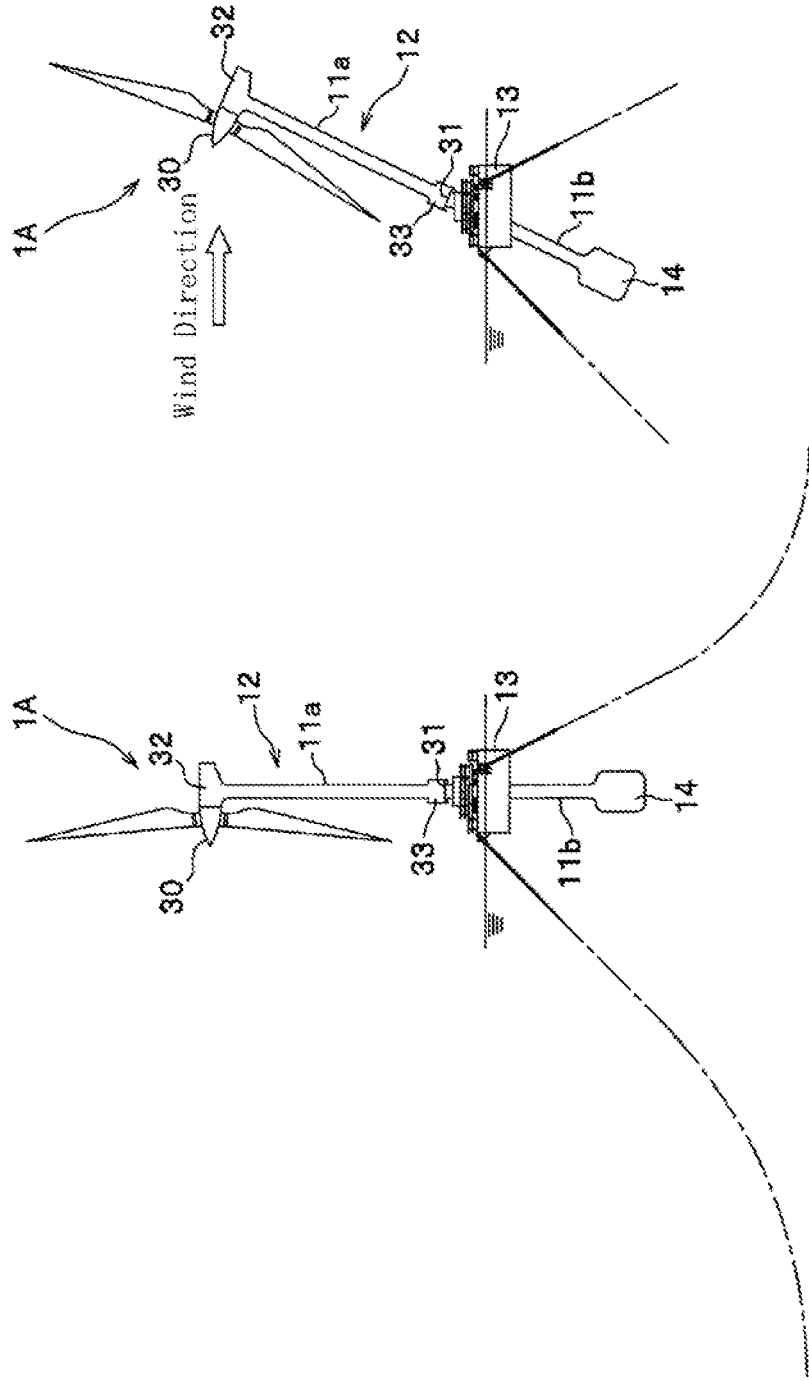
FIGS. 4(a) and 4(b) schematically show a case where a horizontal-axis wind turbine is tiltably supported by a floating structure in a floating structure fluid dynamic force use system according to the second embodiment, where

As shown in FIG. 4(a), an assembly 12 of the floating structure fluid dynamic force use system 1A has the horizontal-axis wind turbine 30 at an upper end of the upper support column 11a. In addition, the upper support column 11a is rotatably connected to the lower support column 11b in a rigid state with respect to a center axis of the support column 11. In a lower end part of the lower support column 11b, a ballast 14 is provided for setting a center of gravity of the assembly 12 below water. The assembly 12 is supported tiltably with respect to a floating structure 13.

Regarding the assembly 12 of the floating structure fluid dynamic force use system 1A, when the horizontal-axis wind turbine 30 is exposed to an excessive wind speed, the assembly 12 including the upper support column 11a supporting the wind turbine is inclined, while the floating structure 13 is horizontally stable, as shown in FIG. 4 (b). This inclination achieves an effect of fending off the wind and an effect of lowering the wind-receiving part to a height where the wind speed is low. Thus, the wind force received by the horizontal-axis wind turbine 30 can be greatly reduced. This can reduce the possibility that the horizontal-axis wind turbine 30 may be damaged by a strong wind, and accordingly achieves such an effect that neither a pitch control system nor a brake system is necessarily required.

Figure 5A:
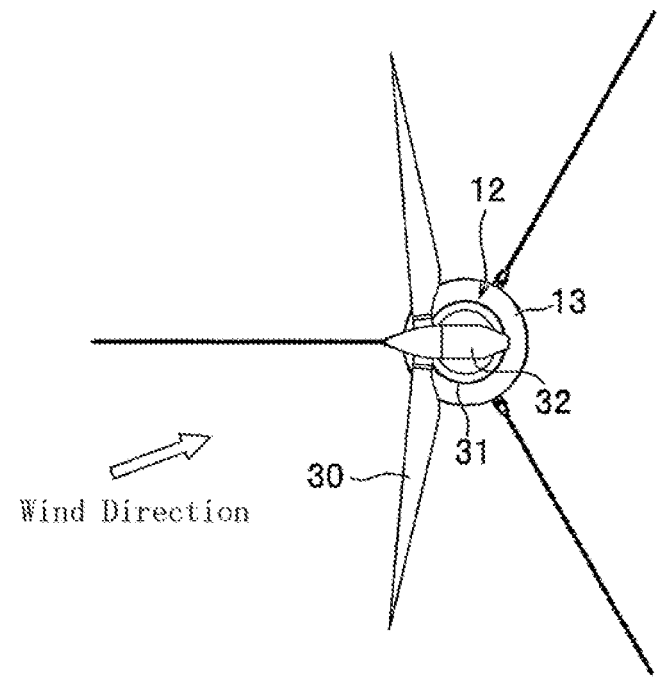
FIGS. 5(a) and 5(b) show plan views of the floating structure fluid dynamic force use system according to the second embodiment, where
Figure 5B:
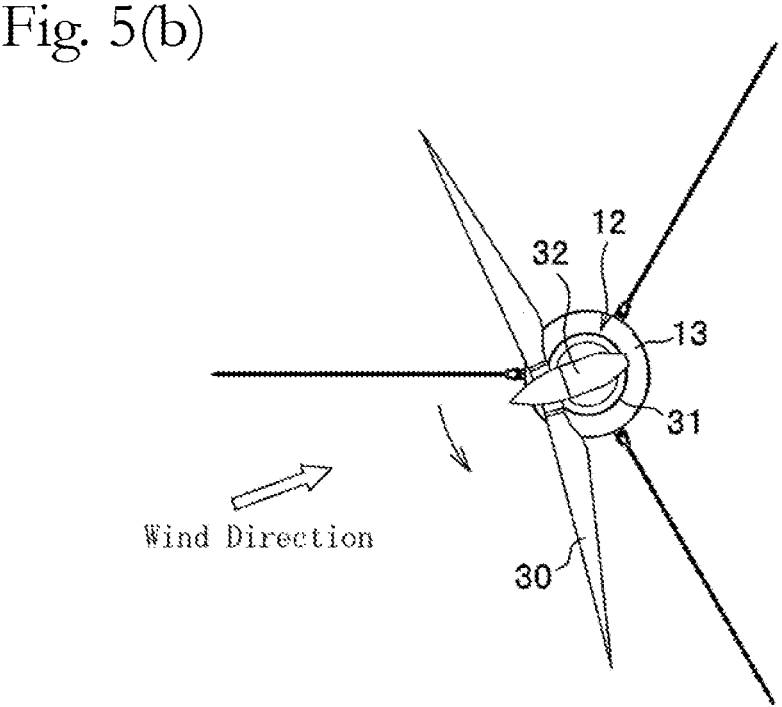

In addition, since the assembly 12 of the floating structure fluid dynamic force use system 1A itself has a stability moment, it is unnecessary to firmly support the upper support column 11a by the floating structure 13. Hence, as shown in FIGS. 5(a) and 5(b), the horizontal-axis wind turbine 30 can be supported so as to be rotatable together with the upper support column 11a with respect to the floating structure 13. For this reason, a turntable 31, which is necessary for a horizontal-axis wind turbine, for facing the wind turbine to the direction of the wind can be provided not immediately below a nacelle 32 in the air but near a top of a deck of the floating structure 13 (in an upper end part of the lower support column 11b) as shown in FIGS. 6(a) and 6(b).

Note that when a wind turbine support column is rotated, it is generally necessary to hold the support column by providing guy-wires in four directions as seen in a vertical-axis Darrieus wind turbine on land, because the support column is difficult to fix at a lower end. However, in the floating structure fluid dynamic force use system according to the second embodiment, an overturning moment of the support column 11 is directly supported by a stability moment of the ballast 14 provided to penetrate the floating structure 13, and hence the need for obtaining a counterforce to the overturning moment from the floating structure 13 is eliminated. Thus, this configuration is made possible.

Figure 6A:
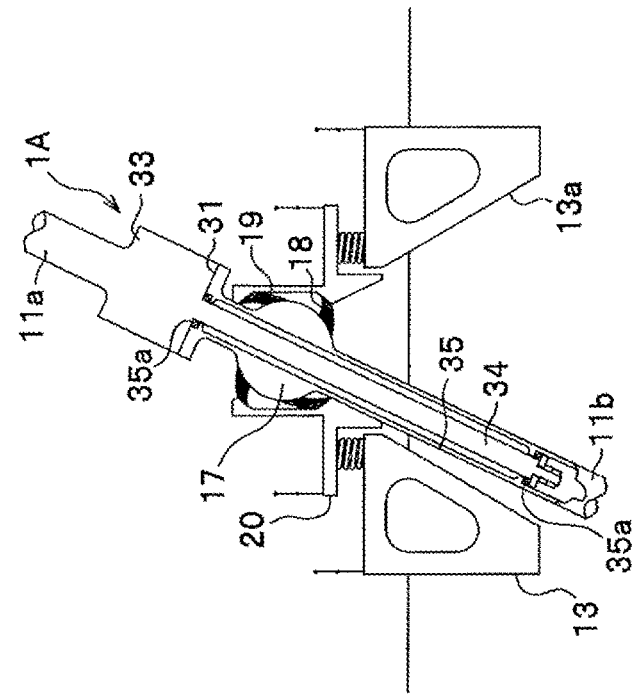
FIGS. 6(a) and 6(b) show enlarged cross-sectional views of a connection part between an assembly and the floating structure of the second embodiment, where

In addition, conventionally, a step-up gear, a power generator, and the like (not illustrated), which are required to be disposed on the nacelle 32 because it is desirable to attach them at a position closer to the blades of the wind turbine than the position of the turntable 31 is, can be provided immediately above the turntable 31, i.e., in a machine room 33 (see FIG. 6(a)) near the top of the deck of the floating structure 13. In this case, the horizontal axis rotation in the air can be converted to a vertical axis rotation by bevel gears provided inside the nacelle 32 to rotate a transmission shaft inside the upper support column 11a, and can be transmitted to the step-up gear and the power generator in the machine room 33. According to this configuration, each of a pitch control system, a step-up gear, a lubricant oil system therefor, a power generator, a control panel therefor, a brake system, and a turntable, which are provided in the nacelle 32 in the air in a typical horizontal-axis wind turbine, can be provided on the deck near the floating structure 13 or can be eliminated. Hence, this configuration achieves a great improvement effect on center of gravity, as well as effects such as relaxation of marine conditions where maintenance can be conducted, reduction in costs and risk associated with maintenance, relaxation of design conditions such as lateral G forces on machines, and prevention of failure due to lateral G force or the like.

Figure 6B:
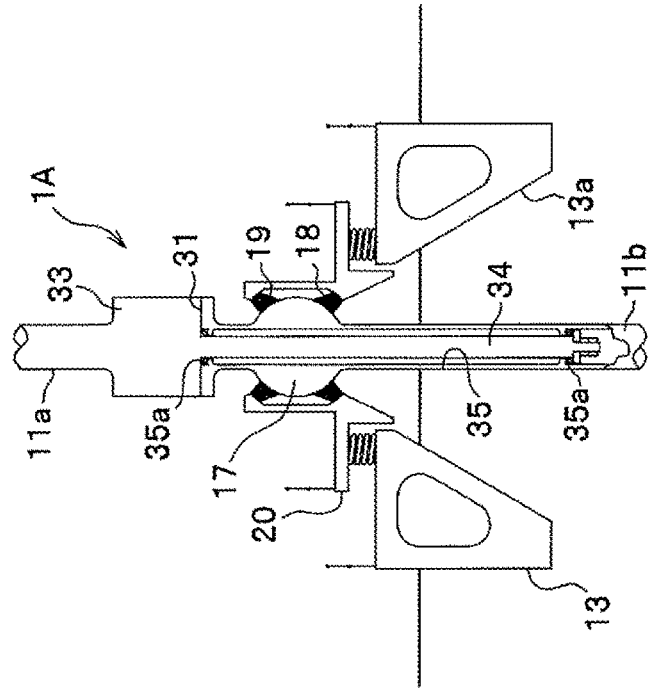

As shown in FIGS. 6(a) and 6(b), the machine room 33 and an insertion shaft part 34 are provided in a lower end part of the upper support column 11a. In addition, the turntable 31 is provided in the upper end part of the lower support column 11b. A shaft hole 35 is provided at a center of the turntable 31, and bearings 35a and 35a rotatably supporting the insertion shaft part 34 are set at an upper end and a lower end of the shaft hole 35. In addition, a spherical part 17 is provided integrally on an upper side of the lower support column 11b. Thus, in the assembly 12, the entire support column 11 is supported tiltably with respect to the floating structure 13, and the upper support column 11a and the horizontal-axis wind turbine 30 are supported rotatably with respect to the floating structure 13.

Third Embodiment

A floating structure fluid dynamic force use system 1B according to a third embodiment is different from those of the first and second embodiments mainly in the following three points: (1) a Darrieus wind turbine 40 is employed as a force-receiving part; (2) a Savonius water turbine 50 is employed as the ballast 14; and (3) the lower support column 11b is also configured to be relatively rotatable with respect to the floating structure 13.

In the following description, the differences from the first and second embodiments are mainly described, and common elements are denoted by the same reference numerals and are not described.

As shown in FIGS. 7 (a) and 7 (b), the floating structure fluid dynamic force use system 1B according to the third embodiment includes, as a force-receiving part, the Darrieus wind turbine 40, which is one of the lift-type vertical-axis wind turbines. The Darrieus wind turbine 40 includes an upper support column 11a, serving as a vertical shaft, and three blades 41 provided around the upper support column 11a at regular intervals. Upper end parts 41a and lower end parts 41b of the blades 41 are rotatably supported by an upper bracket 42 provided in an upper end part of the upper support column 11a and a lower bracket 43 provided on a lower end side of the upper support column 11a in a vertical direction. Central parts 41c of the blades 41 are configured in a hinge structure. In addition, the lower bracket 43 is configured to be slidable with respect to the upper support column 11a. The blades 41 are configured such that the radius r of rotation of the blades 41 can be changed by sliding the lower bracket 43 vertically to bend the central parts 41c of the blades 41.

The Savonius water turbine 50 also has a function of the ballast 14, and has an upper end part supported by the lower support column 11b. As shown in part (c) of FIG. 7, the Savonius water turbine 50 includes blades 51 and 51 having such shapes that a cylinder is divided into halves in the axial direction. The two blades 51 and 51 are joined to each other along the divided plane in a shape of being shifted from each other. The Savonius water turbine 50 rotates when a tidal flow passes through a space 51a surrounded by the blades 51 and 51. The Savonius water turbine 50 according to the third embodiment has a structure in which two stages each including such blades 51 and 51 are vertically staked on each other and set so that the phases thereof are shifted from each other by 90 degrees.

For example, the configuration, the dimensions, the mass, and the like of the Savonius water turbine 50 are set so that the product of the distance from the center of tilting of the support column 11 to the center of gravity of the Savonius water turbine 50 and the weight in water of the Savonius water turbine 50 can be larger than the product of the distance from the center of tilting of the support column 11 to the center of gravity of the Darrieus wind turbine 40 and the weight in the air of the Darrieus wind turbine 40. Thus, the Savonius water turbine 50 functions also as the ballast 14, so that the center of gravity of the assembly 12 is set below water, and a stability moment can be obtained.

Next, a supporting structure of the assembly 12 in the third embodiment is described with reference to parts (a) and (b) of FIG. 8.

Figure 8A:
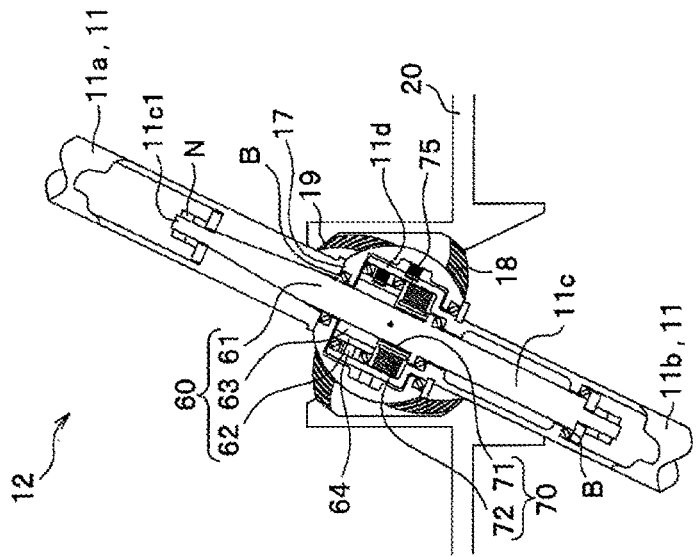
FIGS. 8(a) and 8(b) show enlarged cross-sectional views showing a connection part between an assembly and the floating structure of the third embodiment, where

As shown in FIG. 8(a), the upper support column 11a, the lower support column 11b, and the spherical part 17 are connected to each other in a relatively rotatable manner, in the third embodiment.

Figure 8B:
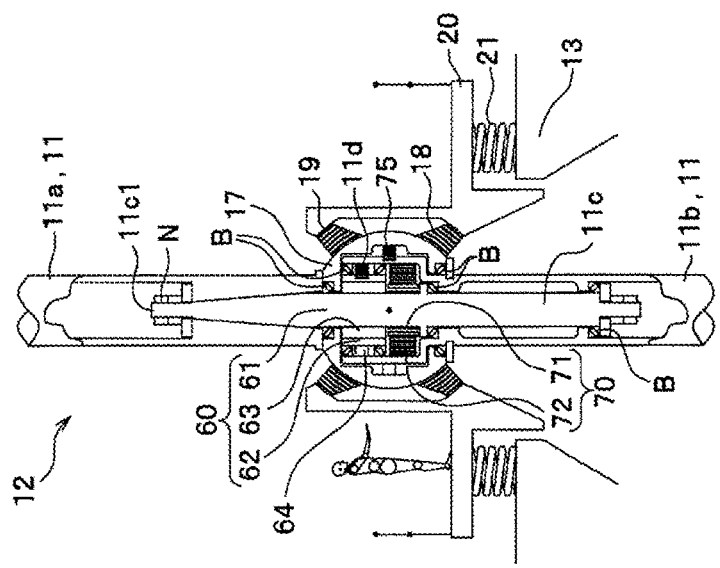

A lower end part of the upper support column 11a is integrally joined to an upper part of a connection member 11c by means of a taper shank. A lower end of the connection member 11c is inserted into the upper end part of the lower support column 11b and rotatably connected thereto. In addition, an upper end of the connection member 11c is formed in a tapered shape having a diameter decreasing upward, and inserted into a hole part 11a1 being formed in the lower end part of the upper support column 11a and having an inverted tapered shape. A screw thread is formed in an upper end part 11c1 of the connection member 11c. Tightening a nut N causes the connection member 11c to move the lower support column 11b toward the upper support column 11a, and these are integrally joined to each other. Bearings B are disposed at suitable positions between the connection member 11c and the lower support column 11b, and the connection member 11c and the lower support column 11b are rotatable relative to each other. In addition, the spherical part 17 is fitted onto a further outside of the upper end part of the lower support column 11b. A bearing B is provided between the spherical part 17 and the lower support column 11b, and the spherical part 17 and the lower support column 11b are rotatable relative to each other. The spherical part 17 is tiltably supported by a support frame 20 with elastic rubber supports 18 and 19 provided therebetween. Thus, the upper support column 11a, the lower support column 11b, and the spherical part 17 are rotatable relative to each other, while being firmly connected to each other in a rigid state in the axial direction, and are tiltable with respect to the floating structure 13, as shown in FIG. 8(b).

A cylindrical part 11d having a cylindrical shape and an opened upper part is formed in an upper end part of the lower support column 11b. In addition, a gear system 60 and a rotation energy extraction part comprising a power generator 70 are disposed between the cylindrical part 11d and the connection member 11c (i.e., between the upper support column 11a and the lower support column 11b).

The gear system 60 includes, for example, a planetary gear system, and has a function of coaxially rotating the upper support column 11a and the lower support column 11b in directions opposite from each other. The gear system 60 includes a sun gear 61 carved around the connection member 11c, a ring gear 62 connected to the cylindrical part 11d with a ratchet mechanism 64 described later interposed therebetween, and multiple planetary gears 63 set between the sun gear 61 and the ring gear 62. The planetary gears 63 are connected to the spherical part 17 in an immovable manner by an unillustrated carrier. Thus, for example, when the Savonius water turbine 50 and the lower support column 11b viewed from above start rotating in a clockwise direction because of a tidal flow, the gear system 60 causes the upper support column 11a and the Darrieus wind turbine 40 viewed from above to start rotating (be activated) in a counterclockwise direction. This can improve an activation property of the Darrieus wind turbine 40.

In addition, the gear system 60 also has a function of a step-up device for stepping up the rotation of the lower support column 11b and transmitting the stepped-up rotation to the upper support column 11a. For example, by adjusting a gear ratio of the planetary gear system, a setting can be made in which when the Savonius water turbine 50 (i.e., the ring gear 62) is rotated once, the Darrieus wind turbine 40 (i.e., the sun gear 61) can be rotated multiple times (for example, 8 times). Thus, the design rotation speed of the wind turbine and the design rotation speed of the water turbine can be set appropriately according to the wind speed and the flow rate.

For example, a case where a design tidal flow rate during activation is 0.3 m/s and a design wind speed during activation is 3 m/s is described. In order for the Darrieus wind turbine 40 to start spontaneous rotation, it is necessary to activate the Darrieus wind turbine 40, so that the peripheral speed of the Darrieus wind turbine 40 can be about three times the wind speed or higher, i.e., about 9 m/s or higher. When the radius r of rotation of the Darrieus wind turbine 40 is 20 m, it is necessary to rotate the Darrieus wind turbine 40 at 4.3 rpm. On the other hand, the Savonius water turbine 50 rotates only at a peripheral speed about the same as the tidal flow. When the Savonius water turbine 50 has a radius of 5 m, the peripheral speed is about 0.6 rpm. Hence, the rotation speed of the Savonius water turbine 50 is stepped up 8 times by the planetary gear system provided between the upper support column 11a, which is the wind turbine shaft, and the lower support column 11b, which is the water turbine shaft, and the stepped-up rotation is transmitted to the Darrieus wind turbine 40. In this case, the fluid speed is reduced to ⅒ when compared with a case where the Savonius water turbine 50 is provided in the air. Hence, if the specific gravities of the fluids are equal, the generated torque is ¹⁄₁₀₀, which is the square of ⅒, and the torque is further reduced to ⅛, because of the stepping-up. Hence, the torque for activating the Darrieus wind turbine 40 is ¹⁄₈₀₀. However, since the specific gravity of the fluid increases by 800 times in reality, the Darrieus wind turbine 40 can be activated by a Savonius water turbine 50 in a size about the same as that of a Savonius water turbine on land.

The ratchet mechanism 64 has a function of not transmitting the rotation of the upper support column 11a to the lower support column 11b under a predetermined condition. Specifically, when the Savonius water turbine 50 in a stopped state starts rotating, the rotation of the Savonius water turbine 50 is transmitted to the ring gear 62 via the ratchet mechanism 64. With the rotation of the ring gear 62, the Darrieus wind turbine 40 connected to the sun gear 61 starts rotating at a speed eight times that of the Savonius water turbine 50 in an opposite direction. Then, the speed of the rotation of the Darrieus wind turbine 40 reached a speed which is eight times that of the Savonius water turbine 50 or higher (i.e., the stepped-up rotation speed of the Savonius water turbine 50 or higher) because of the wind force, the ring gear 62 runs idle with respect to the ratchet mechanism 64. Thus, the rotation of the Darrieus wind turbine 40 is not transmitted to the Savonius water turbine 50 anymore.

Hence, the Savonius water turbine 50 does not serve as a load (brake) on the Darrieus wind turbine 40.

The power generator 70 having a rotor 71 and a stator 72 is disposed inside the cylindrical part 11d and below the gear system 60. The rotor 71 is fixed to the connection member 11c, and the stator 72 is fixed to the cylindrical part 11d. Accordingly, the rotor 71 and the stator 72 rotate in the opposite directions in the power generator 70. Hence, the power generator 70 can efficiently generate electric power based on the differential velocity between the rotor 71 and the stator 72.

Here, a counter torque acts between the rotor 71 and the stator 72. However, the rotor 71 and the stator 72 are respectively fixed to the upper support column 11a and the lower support column 11b which rotate in opposite directions. Hence, the counter torque is cancelled. For this reason, a mooring facility for preventing rotation of the floating structure 13 can be simplified and reduced in size.

Note that, in the third embodiment, a ratchet 75 is disposed also between the cylindrical part 11d and the spherical part 17. Thus, even when, for example, no tidal flow exists, electric power can be generated without corotation of the lower support column 11b with the upper support column 11a.

Next, a retractor mechanism of the Darrieus wind turbine 40 in the third embodiment is described with reference to FIG. 9.

Figure 9:
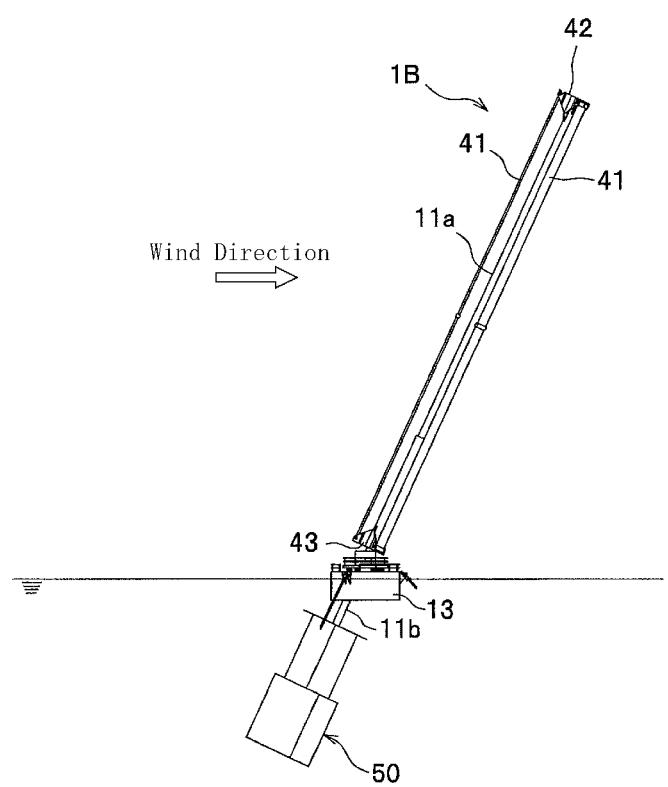
FIG. 9 is a side view schematically showing a state where the floating structure fluid dynamic force use system according to the third embodiment is taking a countermeasure against a strong wind.

As shown in FIG. 9, the blades 41 of the Darrieus wind turbine 40 can be deformed into straight line shapes by sliding the lower bracket 43 downward with respect to the upper support column 11a. Thus, the radius r of rotation of the Darrieus wind turbine 40 can be made substantially zero, so that the blades 41 can be prevented from being damaged by a strong wind, the overturning moment can be reduced by reducing the wind-receiving area.

Fourth Embodiment

A floating structure fluid dynamic force use system 10 according to a fourth embodiment is different from those of the first to third embodiments mainly in that an assembly 80 itself has buoyancy, that electric power is generated based on the difference in vertical movement due to waves between the assembly 80 and a floating structure 13.

Figure 10A:
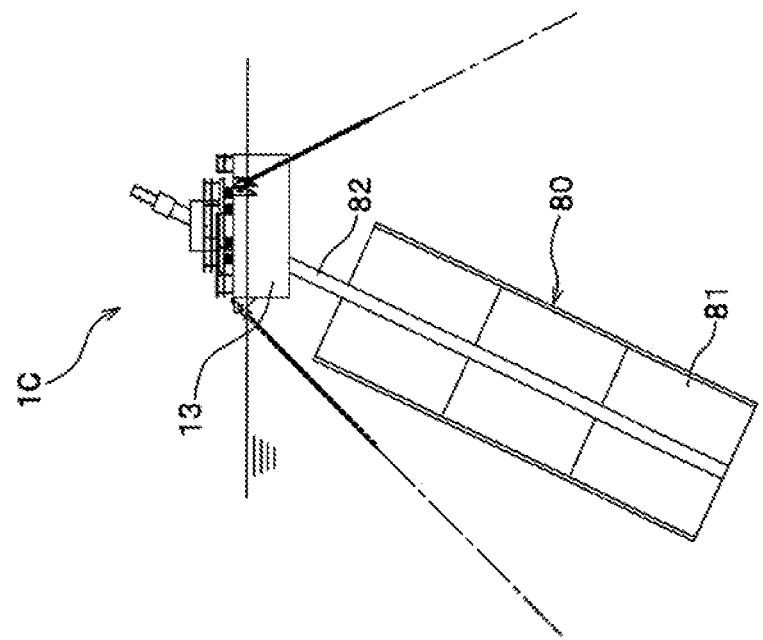
Figure 10B:
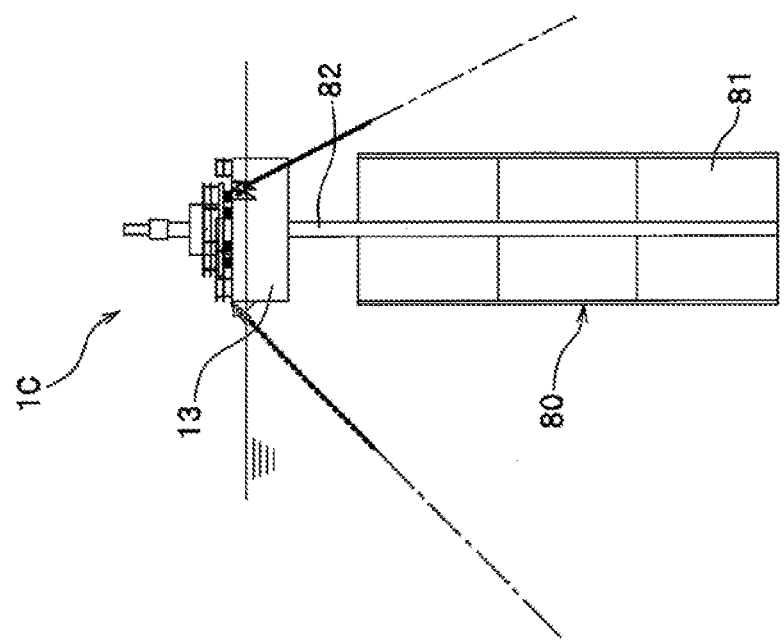
FIG. 10(b) shows an inclined state.

As shown in FIGS. 10(a) and 10(b), the floating structure fluid dynamic force use system 10 according to the fourth embodiment includes the assembly 80 having buoyancy, and the floating structure 13 supporting the assembly 80 tiltably, rotatably, and vertically movably.

The assembly 80 mainly includes, for example, a Darrieus vertical-axis water turbine 81 and a support column 82 serving as a rotation shaft. The assembly 80 has a buoyancy enough for the assembly 80 itself to float on a water surface by, for example, forming the support column 82 by a hollow member. The assembly 80 is formed in a vertically elongated shape, and hence is less likely to be influenced by vertical movement of the water surface due to waves. On the other hand, the floating structure 13 is more likely to be influenced by the vertical movement of the water surface due to waves than the assembly 80. For this reason, the assembly 80 and the floating structure 13 move vertically relative to each other depending on the difference between response speeds to waves.

The assembly 80 is tiltably supported by the floating structure 13. Hence, even when a large tidal flow force is exerted, the assembly 80 can be inclined to release the tidal flow force, as shown in FIG. 10(b). In addition, since the vertical-axis water turbine 81 functions as a ballast, the assembly 80 can restore an upright state.

Moreover, since the assembly 80 is supported rotatably with respect to the floating structure 13, the tidal flow energy can be extracted when a power generator 70 described later (see FIGS. 11(a) and 11(b)) is rotated by the rotation of the assembly 80.

In addition, the assembly 80 is supported vertically movably with respect to the floating structure, and includes a rotation force conversion mechanism 88 as a vertical-movement energy extraction part for converting the vertical movement to rotation force. Thus, the relative vertical movement of the assembly 80 can be converted to rotational motion, and used as activation force of the Darrieus vertical-axis water turbine 81.

Next, a supporting structure of the floating structure fluid dynamic force use system 10 according to the fourth embodiment is described with reference to FIGS. 11(a) and 11(b).

Figure 11A:
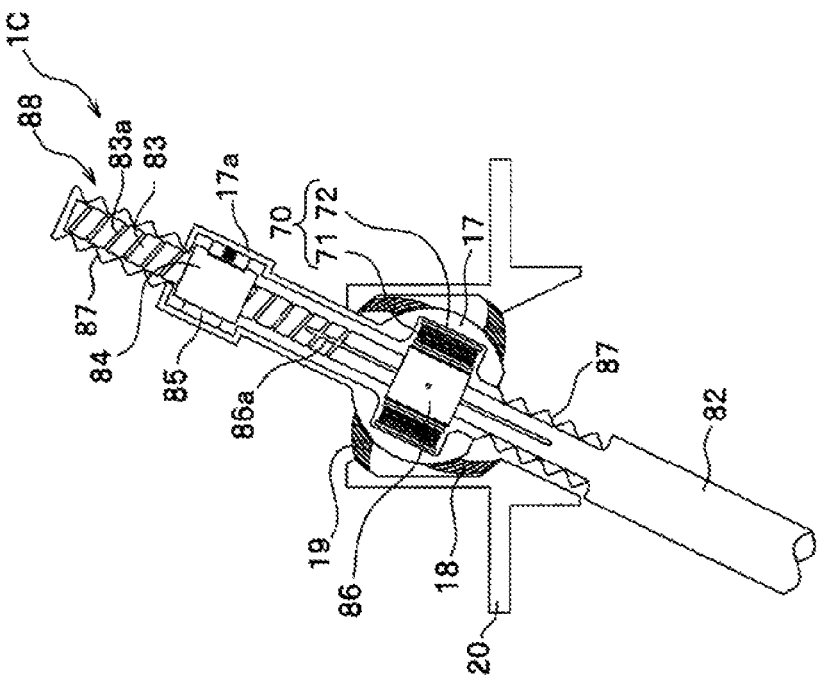
FIGS. 11(a) and 11(b) show enlarged cross-sectional views of a connection part between an assembly and the floating structure of the fourth embodiment, where
Figure 11B:
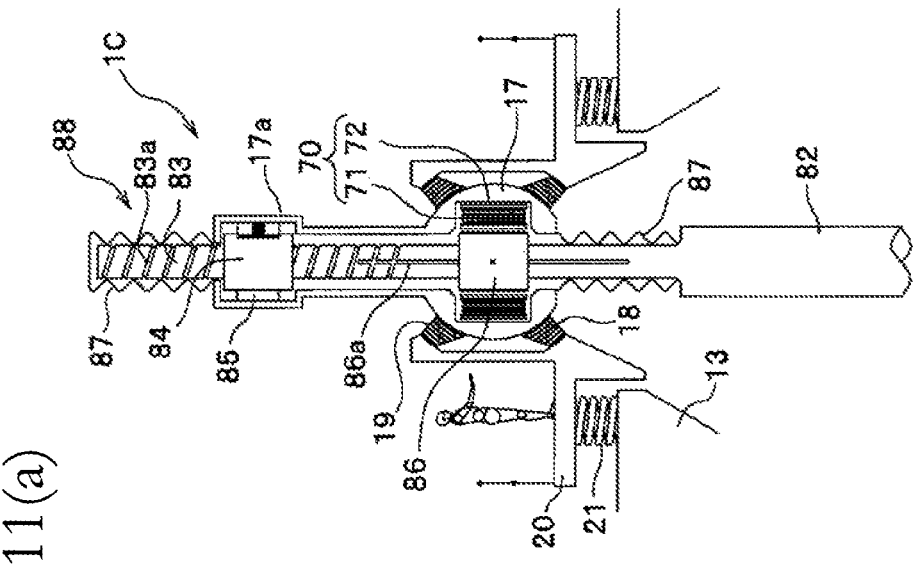

As shown in FIG. 11(a), a spherical part 17 of the assembly 80 is tiltably supported by a support frame 20 with elastic rubber supports 18 and 19 provided therebetween, as in the case of the other embodiments described above. An upper end part 83 of the support column 82 serving as a rotation shaft of the vertical-axis water turbine 81 is set in a center part of the spherical part 17 in a vertically penetrating manner.

In this embodiment, the vertical-movement energy extraction part comprises a ball spline bushing 86 and a stator 72. The ball spline bushing 86, which is a linear-motion bearing, is fitted into the upper end part 83 of the support column 82. The ball spline bushing 86 is disposed movably in the vertical direction (axial direction) with respect to the upper end part 83 of the support column 82. On the other hand, the ball spline bushing 86 is held by the spherical part 17 in a vertically immovable manner. Moreover, the ball spline bushing 86 engages with a spline groove 86a carved in the upper end part 83 of the support column 82, and hence is configured to rotate with the support column 82. A rotor 71 of the power generator 70 is fixed to the ball spline bushing 86, and the stator 72 is fixed to an inner peripheral surface of the spherical part 17. Thus, when the Darrieus vertical-axis water turbine 81 rotates, the rotor 71 rotates together with the ball spline bushing 86. The stator 72 does not rotate because fixed to the spherical part 17. Hence, electric power is generated based on relative rotation between the rotor 71 and the stator 72. Note that a counter torque generated in the stator 72 is loaded on a mooring system of the floating structure 13.

A screw thread 83a is carved in a part of the upper end part 83 of the support column 82 extending beyond the spherical part 17, and a nut 84 is fitted on the part. Thus, a so-called ball-screw mechanism is formed by the screw thread 83a and the nut 84. On the other hand, a cylindrical nut-holding part 17a is formed in an upper part of the spherical part 17 in a protruding manner, and holds the nut 84 rotatably in one direction and vertically immovably with a ratchet mechanism 85 provided therebetween. The screw thread 83a, the nut 84, the ratchet mechanism 85, and the nut-holding part 17a constitute the rotation force conversion mechanism 88. This rotation force conversion mechanism 88 activates the vertical-axis water turbine 81.

Specifically, for example, the ratchet mechanism 85 is provided so that the nut 84 viewed from above can rotate counterclockwise (becomes free with respect to the ratchet), but cannot rotate clockwise. In addition, the Darrieus vertical-axis water turbine 81 is provided to rotate counterclockwise. Moreover, the screw thread 83*a* is carved so that when the support column 82 viewed from above is rotated counterclockwise with respect to the nut 84, the support column 82 moves downward with respect to the nut 84.

Then, when the assembly 80 moves upward with respect to the nut 84 (the floating structure 13) with the vertical-axis water turbine 81 being in a stopped state, the nut 84 rotates counterclockwise because of the direction of the screw thread 83*a*. Here, the ratchet mechanism 85 runs idle.

On the other hand, when the assembly 80 moves downward with respect to the nut 84 with the vertical-axis water turbine 81 being in a stopped state, the nut 84 tries to rotate clockwise because of the direction of the screw thread 83*a*, but cannot rotate because of the restriction by the ratchet mechanism 85. For this reason, rather the vertical-axis water turbine 81 rotates counterclockwise and moves downward. Thus, the vertical-axis water turbine 81 is activated.

After the vertical-axis water turbine 81 is activated and starts rotating counterclockwise, the vertical-axis water turbine 81 tries to move downward with respect to the nut 84. However, the vertical-axis water turbine 81 has buoyancy, and hence falls into a state where the vertical-axis water turbine 81 cannot move in the vertical direction anymore after moving downward to some degree. In this state, like the vertical-axis water turbine 81, the nut 84 rotates counterclockwise to keep the relative positional relationship with the vertical-axis water turbine 81. Here, the ratchet mechanism 85 runs idle. Thus, the vertical-axis water turbine 81 rotates, and the power generator 70 generates electric power.

Note that, although not illustrated, an auxiliary power generator including a linear generator (not illustrated) may be disposed between the ball spline bushing 86 and the support column 82. In the linear generator, for example, a translator is attached to the ball spline bushing 86, and a stator is attached to the upper end part 83 of the support column 82. With this configuration, electric power can be generated by utilizing the relative vertical movement between the ball spline bushing 86 and the support column 82.

In addition, in the fourth embodiment, the ball-screw mechanism including the screw thread 83*a* and the nut 84 is employed as the rotation force conversion mechanism, which is included in the vertical-movement energy extraction part comprising the ball spline bushing 86 and the stator 72. However, a rack and pinion mechanism, a connecting rod-crank mechanism, a gyro mechanism, or the like may be employed instead of the ball-screw mechanism.

Next, a wind-propelled vessel 100 according to a fifth embodiment using the floating structure fluid dynamic force use system is described with reference to FIGS. 12(*a*) and 12(*b*).

As shown in FIGS. 12(*a*) and 12(*b*), the wind-propelled vessel 100 according to the fifth embodiment is a so-called yacht, and includes a hull 101 serving as a floating structure and a fixed blade 102 serving as an assembly. The fixed blade 102 has a support column 103 set to penetrate the hull 101. The support column 103 is tiltably and rotatably supported by the hull 101. In addition, the support column 103 includes an upper support column 103*a* on an upper side of a support mechanism 101*a* of the hull 101 and a lower support column 103*b* on a lower side of the support mechanism. The lower support column 103*b* is a part which is formed to be wide in the front-rear direction and functions as a keel. A ballast 104 is disposed in a lower end part of the lower support column 103*b*. Owing to the ballast 104, the center of gravity of the fixed blade 102 is set below water. A damper device 105 for restricting tilt of the support column 103 in the front-rear direction is disposed inside the hull 101. A base end of the damper device 105 is connected to the hull 101, and a tip end of the damper device 105 is connected to an upper part of the keel of the lower support column 103*b*.

Note that the support mechanism 101*a* which tiltably and rotatably supports the support column 103 is not particularly limited, and, for example, the support mechanisms described in the second to fourth embodiments can be employed as appropriate.

When the wind-propelled vessel 100 sails in a crosswind, the keel of the lower support column 103*b* is rotated to create an angle of elevation, so that side slip due to the crosswind can be prevented. Thus, the wind-propelled vessel 100 can sail, with the hull 101 kept facing the advancing direction. In addition, regarding the wind-propelled vessel 100, even when the fixed blade 102 receives a large force corresponding to the wind force and is inclined, the hull 101 does not roll, and the lower support column 103*b* and the ballast 104 are inclined to create a stability moment. This can prevent impairment in comfortability due to inclination of the hull 101, increase in hull resistance, further increase in resistance due to a check helm required because the center of resistance is shifted in the transverse direction, making it possible to achieve an efficient yacht.

Note that when the upper support column 103*a* is rotatable, the support column is difficult to fix at the lower end. Hence, in general, it is necessary to provide a forestay and a sidestay as seen in a conventional yacht and guy-wires as seen in a vertical-axis Darrieus wind turbine on land. However, in the wind-propelled vessel 100, the overturning moment of the upper support column 103*a* is directly borne by the stability moment of the ballast 104 and the lower support column 103*b* provided to penetrate the hull 101. Accordingly, the hull 101 does not have to bear the moment, and hence these can be omitted.

Next, a wind-propelled vessel 110 according to a sixth embodiment is described with reference to FIGS. 13 to 16. The wind-propelled vessel 110 according to the sixth embodiment is different from the above-described wind-propelled vessel 100 according to the fifth embodiment mainly in that the wind-receiving part includes Darrieus wind turbines 40 and that propellers 116 rotated by the rotation of the Darrieus wind turbines 40 are provided.

Figure 13A:
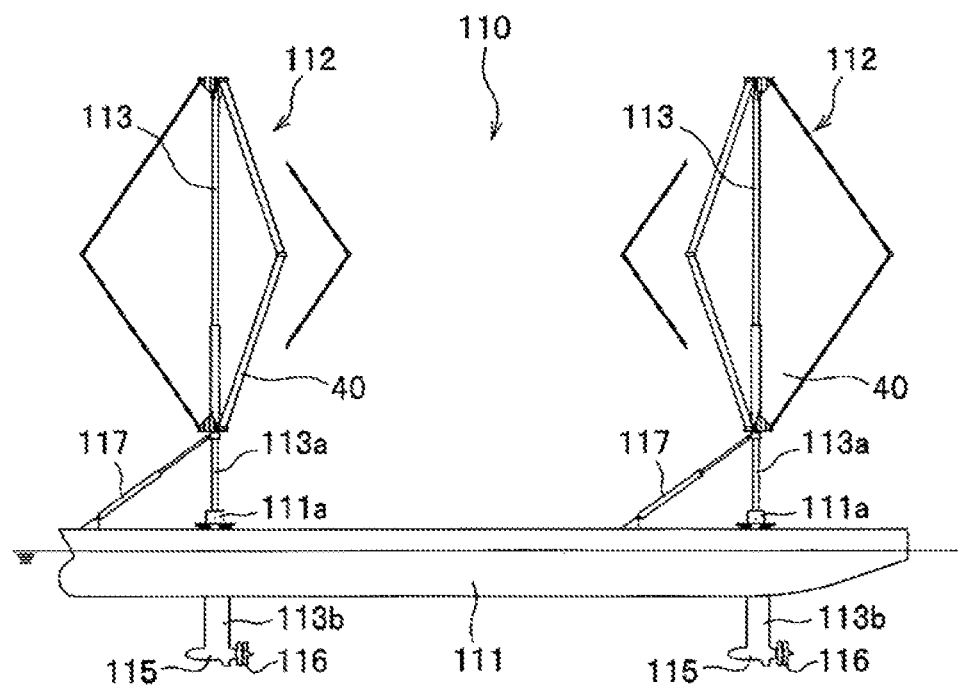
FIGS. 13(a) and 13(b) schematically show a case where two vertical-axis wind turbines are mounted in a wind-propelled vessel according to a sixth embodiment, where FIG. 13 (a) shows aside view.
Figure 13B:
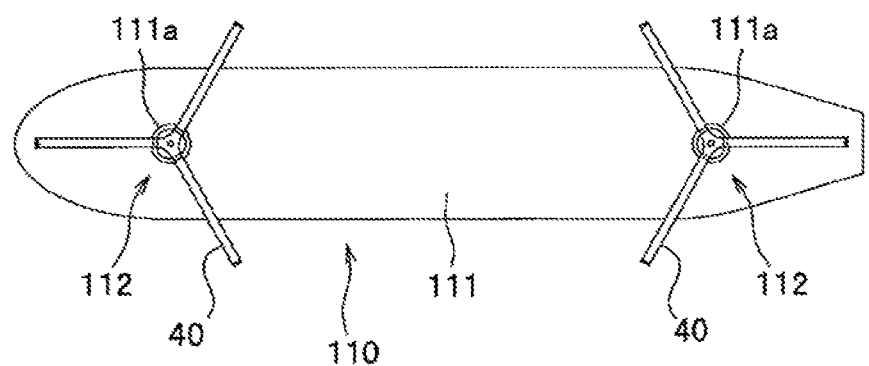

As shown in FIGS. 13(*a*) and 13(*b*), the wind-propelled vessel 110 includes two assemblies 112 and 112 in a front and a rear of a hull 111. Each of the assemblies 112 is supported tiltably and rotatably with respect to the hull 111 with a support mechanism 111*a* provided therebetween. Each of the assemblies 112 mainly includes a support column 113 supporting a force-receiving part and the Darrieus wind turbine 40 as the force-receiving part. The structure of the Darrieus wind turbine 40 is the same as that in the third embodiment, and is not described in detail.

The support column 113 includes an upper support column 113*a* and a lower support column 113*b*. The upper support column 113*a* is a part which functions as a rotation shaft of the Darrieus wind turbine 40. The lower support column 113*b* is a part which is formed to be wide in the front-rear direction and functions as a keel. A ballast 115 is disposed in a lower end part of the lower support column 113b. The ballast 115 has a propeller 116 which rotates with the rotation of the Darrieus wind turbine 40. The support column 113 is configured to tilt only in a rolling direction by a restriction device 117. The restriction device 117 includes, for example, a hydraulic damper or the like.

Figure 14A:
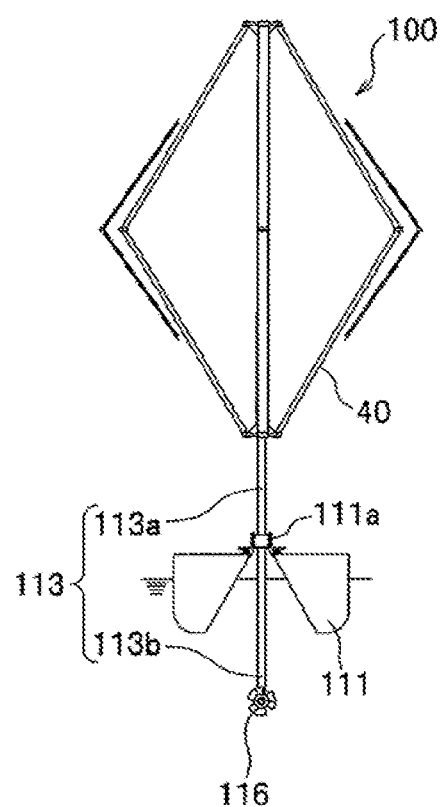
FIGS. 14(a) and 14(b) show cross-sectional views of the wind-propelled vessel according to the sixth embodiment, where
Figure 14B:
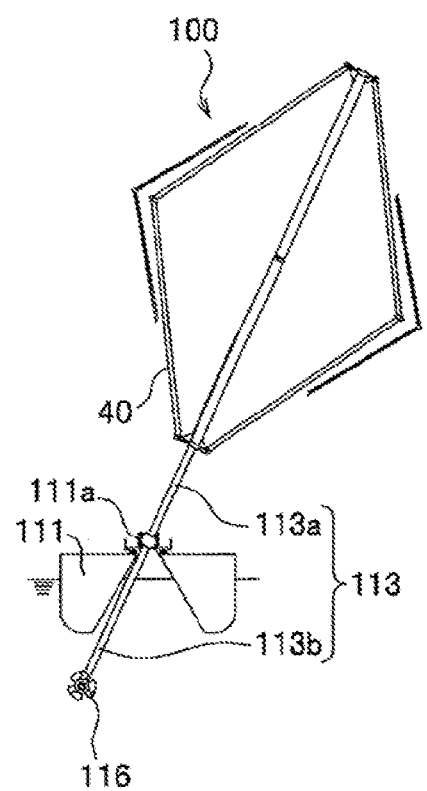

As shown in FIGS. 14(a) and 14(b), the assembly 112 is configured to be tiltable with respect to the hull 111. Regarding the wind-propelled vessel 110, even when the assemblies 112 receive a large force corresponding to the wind force and are inclined, the hull 111 does not roll, and the lower support columns 113b and the ballasts 115 are inclined to create a stability moment. This can prevent impairment in comfortability due to the inclination of the hull 111, increase in hull resistance, and further increase in resistance due to a check helm required because the center of resistance is shafted in the transverse direction, making it possible to obtain an efficient wind-propelled vessel 110.

Figure 15:
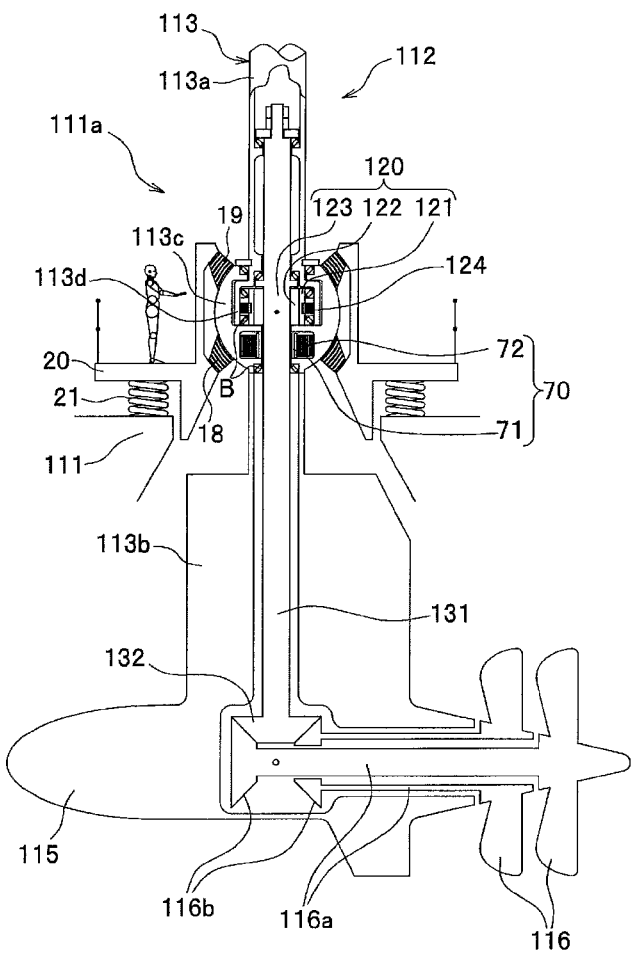
FIG. 15 is an enlarged cross-sectional view showing a connection part between an assembly and a hull of the sixth embodiment.

As shown in FIG. 15, the support mechanism 111a includes a spherical part 113c formed in an upper end part of the lower support column 113b, elastic rubber supports 18 and 19 tiltably supporting the spherical part 113c, and a support frame 20 supporting the elastic rubber supports 18 and 19.

A cylindrical part 113d opened downward is formed in a lower end part of the upper support column 113a. The cylindrical part 113d is rotatably held by the spherical part 113c. A step-up device 120 is disposed inside the cylindrical part 113d. The step-up device 120 includes a ring gear 121, planetary gears 122, and a sun gear 123. The ring gear 121 is connected to the cylindrical part 113d with a ratchet 124 provided therebetween. The planetary gears 122 are connected to the spherical part 113c by an unillustrated carrier in an immovable manner. The sun gear 123 is carved on an outer peripheral surface of the rotation shaft 131 described later. Thus, when the upper support column 113a rotates, the rotation shaft 131 rotates with a predetermined step-up ratio.

In the lower end part of the upper support column 113a, a rotation shaft 131 is rotatably supported in a suspended manner. The rotation shaft 131 penetrates the spherical part 113c and the lower support column 113b and reaches the ballast 115. A bevel gear 132 is provided in a lower end part of the rotation shaft 131. The bevel gear 132 engages with two bevel gears 116b provided at a front end of a horizontal shaft 116a of the propeller 116. Thus, the rotation of the rotation shaft 131 is converted to horizontal axis rotation of the horizontal shaft 116a, and the rotation of the propeller 116 generates propulsion.

A power generator 70 is disposed inside the spherical part 113c and below the step-up device 120. A rotor 71 of the power generator 70 is fixed to an outer peripheral surface of the rotation shaft 131, and a stator 72 of the power generator 70 is fixed to the spherical part 113c. The rotor 71 rotates with the rotation of the rotation shaft 131, so that the power generator 70 generates electric power. At anchor, the assemblies 112 are allowed to tilt about two axes in the roll and pitch directions by releasing the restriction device 117 (see FIGS. 13(a) and 13 (b)), and electric power is generated by wind received by the Darrieus wind turbines 40.

Note that, during sailing, the power generator 70 is configured to serve as a motor to supplement rotation force obtained from wind force.

Figure 16A:
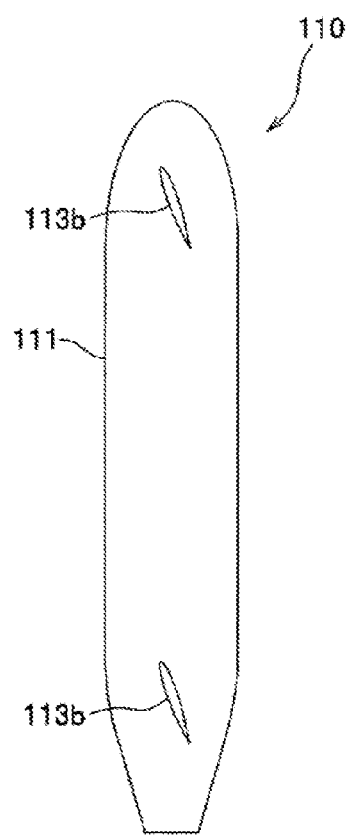
FIGS. 16(a) and 16(b) show bottom views of the wind-propelled vessel according to the sixth embodiment, where shows a state of keels during sailing straight ahead in a crosswind, and shows a state of the keels during turning.

When the wind-propelled vessel 110 sails straight ahead in a crosswind, the lower support columns 113b functioning as keels are inclined in parallel to each other, as shown in FIG. 16(a). Thus, the keels constituted of the lower support columns 113b have angles of elevation, and a lift for preventing the side slip can be generated.

Figure 16B:
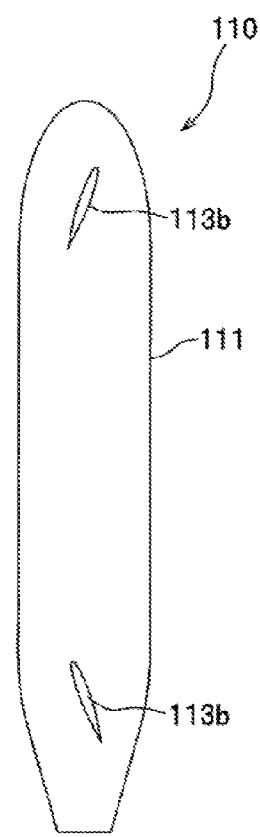
Figure 17:
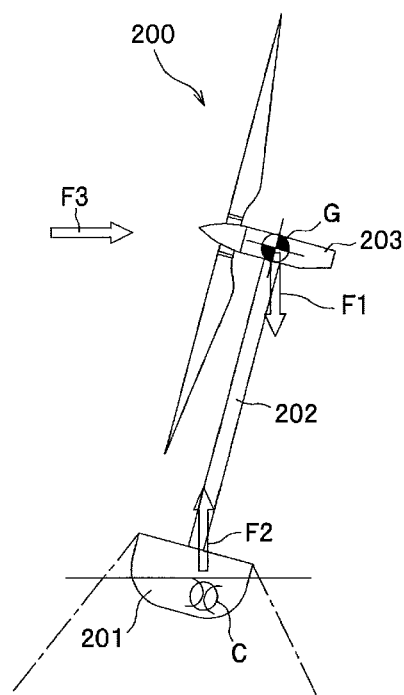
FIG. 17 schematically shows, as Comparative Example 1, a relationship between inclination and stability moment in a case where a horizontal-axis wind turbine is placed on a floating structure.
Figure 18:
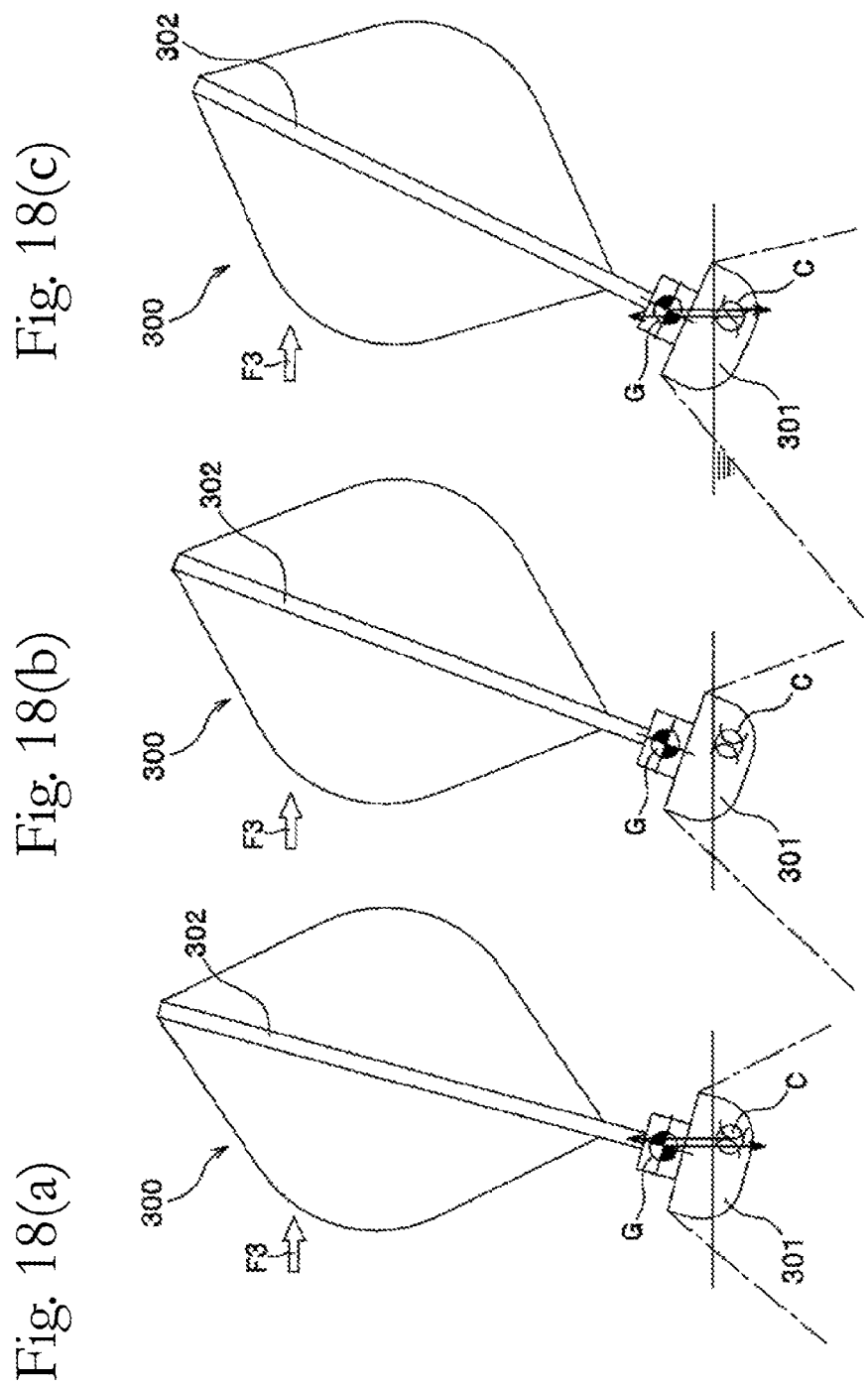
FIGS. 18(a)-18(c) schematically shows, as Comparative Example 2, a relationship between inclination and stability moment in a case where a vertical-axis wind turbine is placed on a floating structure, where
Figure 19:
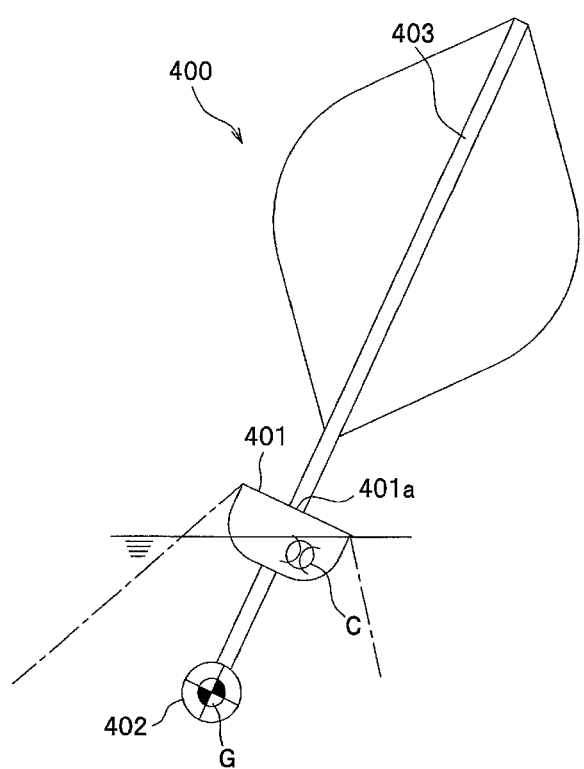
FIG. 19 schematically shows, as Comparative Example 3, a relationship between inclination and stability moment in a case where a vertical-axis wind turbine is supported to be incapable of tilting with respect to a floating structure and a ballast is provided in water.

In addition, when the wind-propelled vessel 110 turns, the lower support columns 113b functioning as keels are inclined in directions opposite from each other, as shown in FIG. 16(b). Thus, the turning radius can be reduced.

Hereinabove, the embodiments of the present invention are described in detail with reference to drawings. However, the present invention is not limited to these embodiments, but can be altered, as appropriate, within a range not departing from the gist of the invention.

For example, the vertical movement mechanism of the fourth embodiment may be added to the support mechanism of the floating structure fluid dynamic force use system 1B according to the third embodiment. With this configuration, the Darrieus wind turbine 40 of the floating structure fluid dynamic force use system 1B can be activated by the vertical movement of the assembly 12 with respect to the floating structure 13. Likewise, the vertical movement mechanism of the fourth embodiment may be added to the support mechanisms 111a of the wind-propelled vessel 110 according to the sixth embodiment.

In addition, in the third embodiment, the gear system 60 and the ratchet mechanism 64 are disposed between the upper support column 11a and the lower support column 11b as shown in FIGS. 8(a) and 8(b). However, when it is unnecessary to step up the rotation of the lower support column 11b, the gear system 60 may be omitted, and only the ratchet mechanism 64 may be set between the upper support column 11a and the lower support column 11b. This configuration makes it possible to transmit the rotation only in one direction or prevent overspeed.

In addition, as shown in FIGS. 8(a) and 8(b), the upper support column 11a and the lower support column 11b are configured to coaxially rotate in the opposite directions by providing the gear system 60 between the upper support column 11a and the lower support column 11b in the third embodiment. However, when it is unnecessary to activate the wind turbine by the water turbine, the gear system 60 can be omitted by setting the directions of the blades of the wind turbine and the water turbine so that the wind turbine and the water turbine can rotate in directions opposite from each other.

In addition, in the wind-propelled vessel 110 according to the sixth embodiment, each lower support column 113b functioning as a keel and the ballast 115 are configured to rotate integrally with each other with respect to the hull 111. However, the present invention is not limited to this configuration. Only the lower support columns 113b serving as keels may be configured to rotate.

Note that, as a reference example of the present invention, a case where an assembly does not tilt with respect to a floating structure is described.

For example, in the configuration of the third embodiment of the present invention, the Darrieus wind turbine 40, which is a lift-type vertical-axis wind turbine, is provided to the upper support column 11a, and the Savonius water turbine 50, which is a drag-type vertical-axis water turbine, is provided to the lower support column 11b, as shown in FIGS. 7(a)-(c). Moreover, as shown in FIGS. 8(a) and 8(b), the support column 11 is supported tiltably with respect to the floating structure 13. However, for example, when the Savonius water turbine 50 is sufficiently large, it is possible to employ such a configuration that the support column 11 is supported to be incapable of tilting with respect to the floating structure 13. In other words, for example, in a sea area with a large water depth or the like, it is easy to sufficiently increase the size of the Savonius water turbine 50. Hence, even when the Darrieus wind turbine 40 receives wind force, the overturning moment due to the wind force can be sufficiently coped with. Therefore, if it is unnecessary to employ such a weight setting that the inclination occurs upon reception of an excessive wind force or tidal flow force in order to fend off the excessive wind force or tidal flow force, or the like, the support column 11 does not necessarily have to be supported tiltably by the floating structure 13. In this case, it is sufficient to attach the support column 11 rotatably with respect to the support frame 20. Thus, the support mechanism can be simplified by omitting the spherical part 17 and the elastic rubber supports 18 and 19.

In addition, in the configuration of the fourth embodiment, only the water turbine is provided. Hence, if it is unnecessary to employ such a weight setting that the inclination occurs upon reception of an excessive tidal flow force in order to fend off the excessive tidal flow force, or the like, the support column 11 does not necessarily have to be tiltably supported by the floating structure 13. In this case, it is possible to employ such a configuration that the support column 11 is rotatably connected to the support frame 20 of the fourth embodiment, and the spherical part 17 and the elastic rubber supports 18 and 19 are omitted.

EXPLANATION OF REFERENCE NUMERALS

1 floating structure fluid dynamic force use system
10 wind-receiving part
11 support column
12 assembly
13 floating structure
14 ballast
15 center of gravity

The invention claimed is:
1. A floating structure fluid dynamic force use system comprising:
an assembly for extracting energy from wind or water; and
a floating structure supporting the assembly, wherein
the assembly includes a force-receiving part for receiving fluid dynamic force and a support column supporting the force-receiving part, the support column having a center axis, wherein the force-receiving part includes a wind-receiving part for receiving a wind force in air,
the assembly has a center of gravity set below water and the support column supports the assembly rotatably around the center axis thereof with respect to the floating structure, wherein the support column includes an upper support column supporting the wind-receiving part and a lower support column supporting a ballast set below water, and
a gear system provided between the upper support column and the lower support column,
wherein
at least wind force is used as the fluid dynamic force, and
the upper support column and the lower support column are connected to each other with the gear system provided therebetween so as to coaxially rotate while keeping a predetermined relative rotational relationship, and are supported rotatably and swingably relative to the floating structure.
2. The floating structure fluid dynamic force use system according to claim 1, further comprising:
a bearing provided between the upper support column and the lower support column, and
wherein the upper support column and the lower support column are connected to each other coaxially rotatably relative to each other in a rigid state with respect to the center axis of the support column.
3. The floating structure fluid dynamic force use system according to claim 1, wherein
the force-receiving part includes a horizontal-axis wind turbine or a vertical-axis wind turbine.
4. The floating structure fluid dynamic force use system according to claim 1, wherein
the force-receiving part includes a horizontal-axis water turbine or a vertical-axis water turbine, and
the horizontal-axis water turbine or the vertical-axis water turbine is set below water and functions as a ballast or part of a ballast.
5. The floating structure fluid dynamic force use system according to claim 1, wherein
the upper support column and the lower support column have a ratchet mechanism by which rotation of one of the upper support column and the lower support column is transmitted to the other under a predetermined condition, while rotation of one of the upper support column and the lower support column is not transmitted to the other under another condition.
6. The floating structure fluid dynamic force use system according to claim 1, wherein
the assembly includes a rotation energy extraction part for extracting rotation energy from rotation of the force-receiving part,
the upper support column and the lower support column are configured to rotate coaxially with each other in directions opposite from each other, and
the rotation energy extraction part is set so as to enable torques generated upon extraction of rotation energies from the upper support column and the lower support column to cancel each other.
7. The floating structure fluid dynamic force use system according to claim 6, wherein
the rotation energy extraction part is a power generator including a rotor and a stator,
the rotor is connected to any one of the upper support column and the lower support column, while the stator is connected to the other, and
the power generator generates electric power based on differential motion between the rotor and the stator.
8. The floating structure fluid dynamic force use system according to claim 1, wherein
the force-receiving part includes a vertical-axis wind turbine driven by a lift force and a vertical-axis water turbine driven by a drag force, and
the vertical-axis wind turbine is activated by rotation of the vertical-axis water turbine.
9. The floating structure fluid dynamic force use system according to claim 8, wherein
the force-receiving part includes the vertical-axis wind turbine driven by a lift force and the vertical-axis water turbine driven by a drag force,
the vertical-axis water turbine is connected to the vertical-axis wind turbine with a step-up device provided therebetween, and
the step-up device transmits rotation of the vertical-axis water turbine to the vertical-axis wind turbine when a rotation speed of the vertical-axis wind turbine is not higher than a rotation speed of the vertical-axis water turbine after stepping up, but does not transmit the rotation of the vertical-axis water turbine to the vertical-axis wind turbine when the rotation speed of the vertical-axis wind turbine is higher than the rotation speed of the vertical-axis water turbine after stepping up.

10. The floating structure fluid dynamic force use system according to claim 1, wherein
the assembly has a buoyancy about equal to own weight of the assembly and is supported vertically movably with respect to the floating structure, and
a vertical-movement energy extraction part is provided for extracting energy from relative vertical movement between the assembly and the floating structure.

11. The floating structure fluid dynamic force use system according to claim 10, wherein
the vertical-movement energy extraction part includes a rotation force conversion mechanism.

12. The floating structure fluid dynamic force use system according to claim 11, wherein
the force-receiving part includes at least any one of a vertical-axis wind turbine driven by a lift force and a vertical-axis water turbine driven by a lift force, and is activated by rotation force obtained by the rotation force conversion mechanism.

13. The floating structure fluid dynamic force use system according to claim 11, wherein
the rotation force conversion mechanism comprises a ball screw.

14. A wind-propelled vessel comprising:
the floating structure fluid dynamic force use system according to claim 1, wherein
the floating structure is a hull, and
the wind-propelled vessel includes a propeller which is set below water and which is rotated by the wind force received by the wind-receiving part substantially around a horizontal axis, and
the wind force is used as at least part of energy for rotating the propeller.

15. The wind-propelled vessel according to claim 14, wherein
the propeller is disposed in the ballast.

16. The wind-propelled vessel according to claim 14, wherein
the ballast or the lower support column functions as a keel that generates lift.

17. The wind-propelled vessel according to claim 16, wherein
the wind-propelled vessel includes a first and a second of the assembly for extracting energy from wind or water, wherein the first assembly is set in a front of the hull and the second assembly is set in a rear of the hull, and
the keel of the first assembly and the keel of the second assembly rotate to have angles of attack in the same direction during sailing straight ahead in a crosswind, and have angles of attack in directions opposite from each other during turning.

* * * * *